(12) United States Patent
Litani

(10) Patent No.: US 10,749,867 B1
(45) Date of Patent: Aug. 18, 2020

(54) SYSTEMS AND METHODS FOR DEVICE DETECTION AND REGISTRATION

(71) Applicant: INMOBILES B.V., Beirut (LB)

(72) Inventor: Charbel Fawaz El Litani, Beirut (LB)

(73) Assignee: INMOBILES B.V., Beirut (LB)

( * ) Notice: Subject to any disclaimer, the term of this patent is extended or adjusted under 35 U.S.C. 154(b) by 0 days.

(21) Appl. No.: 16/877,951

(22) Filed: May 19, 2020

(51) Int. Cl.
| H04L 29/06 | (2006.01) |
| H04W 12/06 | (2009.01) |
| H04W 8/24 | (2009.01) |
| H04W 8/02 | (2009.01) |
| H04W 8/26 | (2009.01) |
| H04W 12/08 | (2009.01) |

(52) U.S. Cl.
CPC ........ H04L 63/0876 (2013.01); H04L 63/102 (2013.01); H04L 63/104 (2013.01); H04L 63/108 (2013.01); H04W 8/02 (2013.01); H04W 8/24 (2013.01); H04W 8/265 (2013.01); H04W 12/06 (2013.01); H04W 12/0802 (2019.01)

(58) Field of Classification Search
CPC .. H04L 63/0876; H04L 63/104; H04W 8/265; H04W 8/24; H04W 8/02
See application file for complete search history.

(56) References Cited

U.S. PATENT DOCUMENTS

| 8,472,919 | B1* | 6/2013 | Sivalingham | H04W 12/06 455/410 |
| 2008/0276090 | A1* | 11/2008 | Merrien | H04L 9/3247 713/169 |
| 2016/0014603 | A1* | 1/2016 | Woodward | H04M 1/677 455/411 |
| 2017/0054718 | A1* | 2/2017 | Banerjee | G06Q 20/322 |
| 2020/0178197 | A1* | 6/2020 | Britt | H04W 60/04 |

* cited by examiner

Primary Examiner — Chau Le
(74) Attorney, Agent, or Firm — Foley & Lardner LLP

(57) ABSTRACT

The system and methods described herein can detect and register devices. One or more processors receive a device identifier of a first device. The device identifier of the first device is authorized responsive to performing a lookup in a first set of databases using the device identifier. The processors receive a record of an event corresponding to the device identifier, the record including the device identifier, a first value associated with the device identifier, and a first event identifier identifying the event. The processors store a first entry identifying the device identifier, the first value, the first event identifier, a specification of the first device, and a first status indicating the first device is authorized. The processors assign the device identifier of the first device to a first group of the plurality of groups. The processors provide data corresponding to the first device and the first status.

20 Claims, 12 Drawing Sheets

SYSTEMS AND METHODS FOR DEVICE DETECTION AND REGISTRATION

BACKGROUND

As the number of mobile devices and other smart devices that connect to telecommunications networks increase, there is a greater need to ensure that such devices are registered and authorized to access telecommunications networks. Through an effective registration or authorization process, entities, such as governments, network providers and others, can identify unauthorized devices that connect to these networks and take certain actions to restrict their access.

SUMMARY

The present disclosure relates to systems and methods for device detection and registration. According to one aspect, a method for device detection and registration is described. The method can include receiving, from a client associated with a first entity, a device identifier of a first device. The method can include transmitting, to the first entity, an instruction indicating that the device identifier of the first device is authorized responsive to performing a lookup in a first set of databases using the device identifier. The method can include receiving, from the first entity, a record of an event corresponding to the device identifier, the record including the device identifier, a first value associated with the device identifier, and a first event identifier identifying the event. The method can include storing, in the first set of databases, a first entry identifying the device identifier, the first value, the first event identifier, a specification of the first device, and a first status indicating the first device is authorized. The first set of databases can include a plurality of second device identifiers corresponding to a plurality of second devices. Each second device identifier of the plurality of second device identifiers can be assigned to a respective group of a plurality of groups. The method can include assigning, the device identifier of the first device to a first group of the plurality of groups. Each device identifier of the first group can be permanently allowed to access one or more networks via one or more mobile network operators. The method can include providing, to a first system maintaining a second set of databases for a first mobile network operator, data corresponding to the first entry identifying the device identifier, the first value, the first event identifier, the specification of the first device, and the first status. The second set of databases can be used by the first mobile network operator to respond to requests to check one or more device identifiers corresponding to respective one or more devices connecting to a first network of the first mobile network operator.

The method can include receiving, from the first system, data corresponding to a second device identifier of a second device, the second device identifier not included in the first set of databases. The data can correspond to the second device identifier stored in the second set of databases. The method can include updating the first set of databases to include a second entry including the data corresponding to the second device identifier of the second device. The method can include assigning, the second entry corresponding to the second device identifier, a second status different from the first status. The method can include assigning the second device identifier to one of a second group of the plurality of groups or a third group of the plurality of groups. Each device identifier included in the second group can temporarily allow access to the one or more networks via the one or more mobile network operators. Each device identifier included in the third group can be restricted from accessing the one or more networks via the one or more mobile network operators.

The method can include providing, to a second system maintaining a third set of databases for a second mobile network operator, data corresponding to the second entry. The third set of databases can be used by the second mobile network operator to respond to requests to check one or more device identifiers corresponding to respective one or more devices connecting to a second network of a second mobile network operator.

The method can include identifying a first time corresponding to a second event when the second device accesses the first network of the first mobile network operator. The method can include updating, responsive to determining that a predetermined amount of time has elapsed since the first time, the second status of the second entry corresponding to the second device identifier to a third status different from the second status and the first status. The method can include assigning the second device identifier to the third group of the plurality of groups.

The method can include the predetermined amount of time being based on a policy. The policy can be generated by a second entity.

The method can include the device identifier included in the first entry being a first device identifier of the first device. The method can include determining that the first device connected to the first network of the first mobile network operator at a first time. The method can include receiving, from the first system, data corresponding to a second device identifier of a second device. The data can correspond to the second device identifier stored in the second set of databases. The method can include determining that the second device identifier of the second device matches the first device identifier included in the first entry. The second device connected to the second network of the second mobile network operator at the first time. The method can include determining that a third device identifier of the second device does not match a corresponding device identifier included in the first entry. The method can include assigning, responsive to determining that the third device identifier of the second device does not match the corresponding device identifier included in the first entry, a label to the first entry indicating that the first device corresponds to a cloned device.

The method can include assigning, responsive to determining that the third device identifier of the second device does not match the corresponding device identifier of the first device included in the first entry, the second device identifier of the second device to one of a second group of the plurality of groups or a third group of the plurality of groups. Each device identifier included in the second group can be temporarily allowed to access the one or more networks via the one or more mobile network operators. Each device identifier included in the third group can be restricted from accessing the one or more networks via the one or more mobile network operators.

The method can include providing, to the first system, the data corresponding to the first entry based on a time based update policy.

The method can include providing, to a plurality of second systems, the data corresponding to the first entry such that the first system and each second system of the plurality of second systems include the first entry.

The method can include the device identifier being at least one of an International Mobile Station Equipment Identity (IMEI), International mobile subscriber identity (IMSI) or a Mobile Station International Subscriber Directory Number (MSISDN).

The method can include receiving, data corresponding to a second device identifier of a second device, the second device identifier included in the first set of databases and assigned a second status different from the first status. The method can include determining, from the received data corresponding to the second device identifier, a second value and a second event identifier identifying a second event. The method can include updating, responsive to determining that the second value and the second event identifier satisfies a status update policy, the second status of the second device identifier to the first status. The method can include assigning, responsive to updating the second status to the first status, the second device identifier to the first group of the plurality of groups and removing the second device identifier from a second group of the plurality of groups.

The method can include receiving data corresponding to a third device identifier of a third device. The method can include determining that the third device identifier corresponds to an unauthorized device. Responsive to determining that the third device identifier corresponds to the unauthorized device, the method can include storing, in the first set of databases, a second entry identifying the third device identifier and a second status indicating that the third device is unauthorized. The method can include assigning, the third device identifier to one of a second group of the plurality of groups or a third group of the plurality of groups, each device identifier included in the second group temporarily allowed to access the one or more networks via the one or more mobile network operators and each device identifier included in the third group restricted from accessing the one or more networks via the one or more mobile network operators.

The method can include receiving data corresponding to a third device identifier of a third device. The method can include determining that the third device identifier corresponds to at least one of a i) duplicate device identifier, ii) a fake device identifier, iii) a fake declaration of specifications or duties due for the third device, or iv) an indication that a transaction event identifying the third device has not been processed. Responsive to determining that the third device identifier corresponds to at least one of i) the duplicate device identifier, ii) the fake device identifier, iii) the fake declaration of specifications of the third device, or iv) the indication that the transaction event identifying the third device has not been processed, the method can include storing in the first set of databases, a second entry identifying the third device identifier and a second status indicating that the third device is unauthorized. The method can include assigning the third device identifier to one of a second group of the plurality of groups or a third group of the plurality of groups. Each device identifier included in the second group can be temporarily allowed to access the one or more networks via the one or more mobile network operators and each device identifier included in the third group restricted from accessing the one or more networks via the one or more mobile network operators.

The present disclosure further relates to a system for device detection and registration. The method includes one or more processors configured by machine-readable instructions. The one or more processors can receive, from a client associated with a first entity, a device identifier of a first device. The one or more processors can transmit, to the first entity, an instruction indicating that the device identifier of the first device is authorized responsive to performing a lookup in a first set of databases using the device identifier. The one or more processors can receive, from the first entity, a record of an event corresponding to the device identifier. The record can include the device identifier, a first value associated with the device identifier, and a first event identifier identifying the event. The one or more processors can store, in the first set of databases, a first entry identifying the device identifier, the first value, the first event identifier, a specification of the first device, and a first status indicating that the first device is authorized. The first set of databases can include a plurality of second device identifiers corresponding to a plurality of second devices. Each second device identifier of the plurality of second device identifiers can be assigned to a respective group of a plurality of groups. The one or more processors can assign the device identifier of the first device to a first group of the plurality of groups. Each device identifier of the first group can be permanently allowed to access one or more networks via one or more mobile network operators. The one or more processors can provide, to a first system maintaining a second set of databases for a first mobile network operator, data corresponding to the first entry identifying the device identifier, the first value, the first event identifier, the specification of the first device and the first status. The second set of databases can be used by the first mobile network operator to respond to requests to check one or more device identifiers corresponding to respective one or more devices connecting to a first network of the first mobile network operator.

The one or more processors can receive, from the first system, data corresponding to a second device identifier of a second device. The second device identifier may not be included in the first set of databases. The data corresponding to the second device identifier can be stored in the second set of databases. The one or more processors can update the first set of databases to include a second entry including the data corresponding to the second device identifier of the second device. The one or more processors can assign, the second entry corresponding to the second device identifier, a second status different from the first status. The one or more processors can assign the second device identifier to one of a second group of the plurality of groups or a third group of the plurality of groups. Each device identifier can be included in the second group temporarily allowed to access the one or more networks via the one or more mobile network operators. Each device identifier can be included in the third group restricted from accessing the one or more networks via the one or more mobile network operators.

The one or more processors can provide, to a second system maintaining a third set of databases for a second mobile network operator, data corresponding to the second entry. The third set of databases can be used by the second mobile network operator to respond to requests to check one or more device identifiers corresponding to respective one or more devices connecting to a second network of the second mobile network operator.

The one or more processors can identify a first time corresponding to a second event when the second device accesses the first network of the first mobile network operator. The one or more processors can update, responsive to determining that a predetermined amount of time has elapsed since the first time, the second status of the second entry corresponding to the second device identifier to a third status different from the second status and the first status. The one or more processors can assign the second device identifier to the third group of the plurality of groups. The predetermined amount of time can be based on a policy. The policy can be generated by a second entity of the one or more processors.

The device identifier included in the first entry can be a first device identifier of the first device. The one or more processors can receive, from the first system, data corresponding to a second device identifier of a second device. The data can correspond to the second device identifier stored in the second set of databases. The one or more processors can determine, that the second device identifier of the second device matches the first device identifier included in the first entry. The one or more processors can determine that a third device identifier of the second device does not match a corresponding device identifier included in the first entry. The one or more processors can assign, responsive to determining that the third device identifier of the second device does not match the corresponding device identifier included in the first entry, a label to the first entry indicating that the first device corresponds to a cloned device.

The present disclosure further relates to a non-transitory computer-readable storage medium having instructions embodied thereon, the instructions being executable by one or more processors. The one or more processors can receive, from a client associated with a first entity, a device identifier of a first device. The one or more processors can transmit, to the first entity, an instruction indicating that the device identifier of the first device is authorized responsive to performing a lookup in a first set of databases using the device identifier. The one or more processors can receive, from the first entity, a record of an event corresponding to the device identifier. The record can include the device identifier, a first value associated with the device identifier, and a first event identifier identifying the event. The one or more processors can store, in the first set of databases, a first entry identifying the device identifier, the first value, the first event identifier, a specification of the first device, and a first status indicating that the first device is authorized. The first set of databases can include a plurality of second device identifiers corresponding to a plurality of second devices. Each second device identifier of the plurality of second device identifiers can be assigned to a respective group of a plurality of groups. The one or more processors can assign the device identifier of the first device to a first group of the plurality of groups. Each device identifier of the first group can be permanently allowed to access one or more networks via one or more mobile network operators. The one or more processors can provide, to a first system maintaining a second set of databases for a first mobile network operator, data corresponding to the first entry identifying the device identifier, the first value, the first event identifier, the specification of the first device, and the first status. The second set of databases can be used by the first mobile network operator to respond to requests to check one or more device identifiers corresponding to respective one or more devices connecting to a first network of the first mobile network operator.

BRIEF DESCRIPTIONS OF THE DRAWINGS

DETAILED DESCRIPTION

Figure 1A:
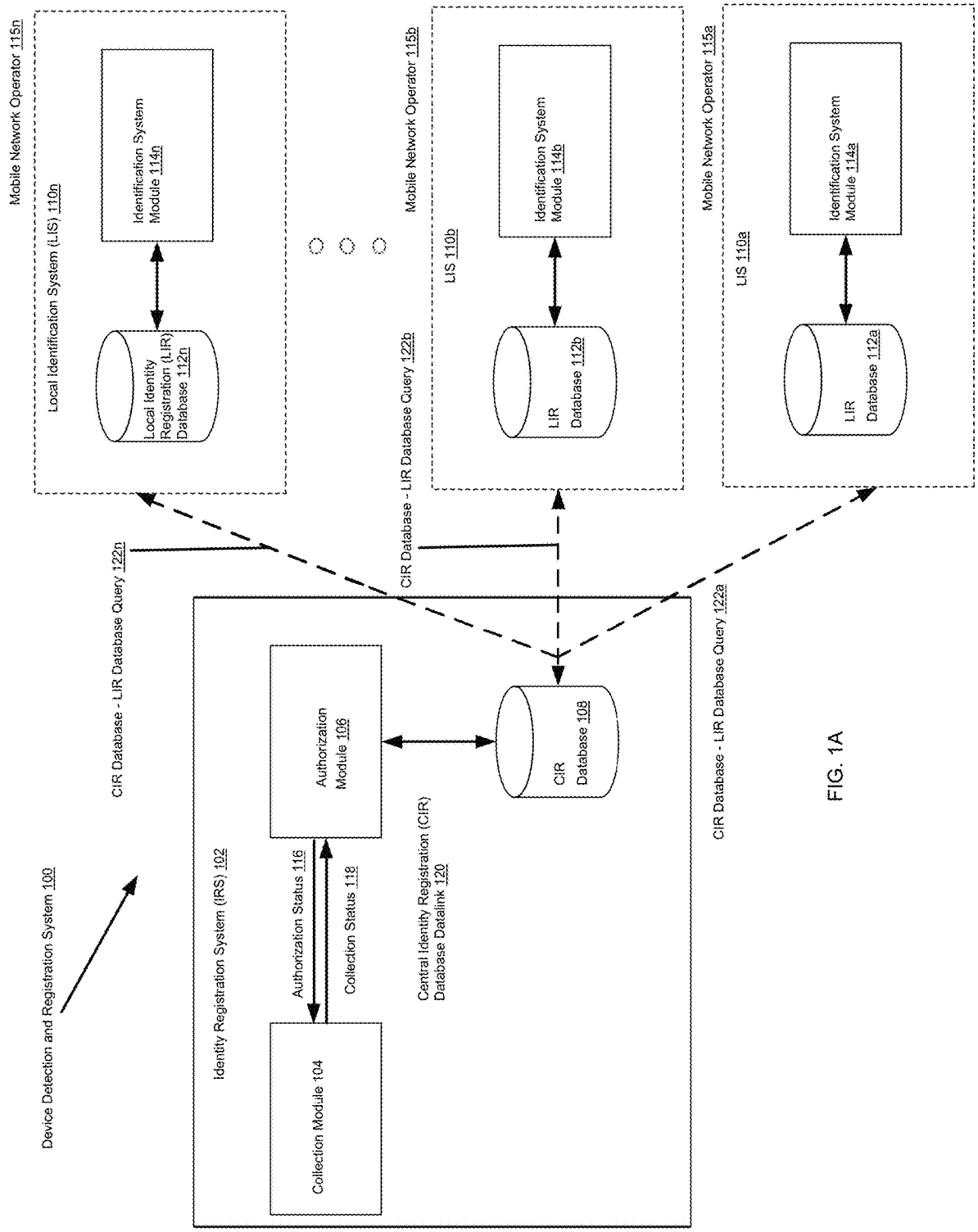
FIG. 1A illustrates a data processing system for aggregating device registrations to one or more databases according to embodiments of the present disclosure.

For purposes of reading the description of the various embodiments of the present invention below, the following descriptions of the sections of the specification and their respective contents may be helpful:

Section A describes systems for device detection and registration;

Section B describes process and workflow of an implementation of the system for device detection and registration;

Section C describes a network environment and computing environment useful for practicing an embodiment of the present invention;

A. Systems for Device Detection and Registration

Counterfeits, stolen, cloned and fraudulent devices are prevalent, which causes a regulatory and security challenge for mobile operators and telecommunications authorities. The difficulty of differentiating between counterfeit devices and authentic devices leads to difficulty in regulating network access. Counterfeit devices can have fake, duplicative, or unauthorized device identifiers. Moreover, the number of unauthorized devices including devices that have an invalid device identifier is increasing, which causes many problems related to the mobile networks (interference, congestion, etc.) and to the economy due to the enormous expansion of black-market activity. These devices might also avoid required payments, leading to a loss in tax revenue for governments. Even if one network attempted to manage all these devices, the large number of networks within a jurisdiction would create data conflicts due to a lack of a centralized management system.

Therefore, a device detection and registration system as described herein can resolve problems related to managing networked devices. Regulatory authorities can be in control of the telecommunications systems by deploying the systems and methods described herein to detect devices and registering them to restrict counterfeit devices from accessing one or more telecommunications networks and improve the security of the one or more telecommunications networks. The device detection and registration system also ensures and facilitates the connection to one or more global or worldwide databases, such as a GSMA database, that store data relating to the devices to detect counterfeit or fake devices and to ensure that devices accessing the telecommunications networks comply with national and international standards.

The device detection and registration system can be configured to include various subsystems or components. In some embodiments, the system can include a centralized identity registration system that can communicate with a plurality of local identity systems that can be deployed on each mobile network operator operating within a jurisdiction. The centralized identity registration system can provide a portal or user interface through which entities, such as importers or retailers, can register the communications devices that are imported into the jurisdiction or sold within the jurisdiction. The centralized identity registration system can determine whether the communications devices to be registered are authentic by comparing the device identifiers of these devices to one or more lists or databases. The centralized identity registration system can further determine if these devices are duplicates, fakes, or counterfeit based on details relating to the devices, such as the device identifiers or device specifications of the devices. The centralized identity registration system can further collect taxes or custom duties for these devices. The centralized identity registration system can include the devices in a centralized database. The centralized identity registration system may store device related information in the centralized database and may assign each device identifier of each device to either a whitelist, graylist or blacklist in the centralized database. The whitelist may include devices that are authentic and have paid their taxes and therefore are permanently allowed to access the networks of the mobile network operators. The graylist may include devices that are temporarily allowed to access the networks in accordance with one or more policies established by the entity managing the centralized identity registration system. The blacklist may include devices that are restricted from accessing the networks of the mobile network operators. Such devices may be devices that have been identified as fake, duplicates, or counterfeit or devices for which taxes have not been paid and any grace periods have been consumed. It is contemplated that one or more additional lists can be generated for different restrictions, and that the device identifiers can be assigned to any of the additional lists. For example, the device identifiers assigned to a particular additional list can be restricted from international calling. In some embodiments, different restrictions can be applied to devices includes in different lists. The data included in the centralized database can be replicated or shared with local databases maintained on the local identity systems. In this way, when a device connects to a network of a mobile network operator, the mobile network operator can check whether the device is authorized or not from the local identity system of the mobile network operator.

The centralized database can also include devices based on information obtained via the one or more local identity systems. In some situations, devices may connect to the network of a mobile network operator without having been registered through the centralized identity registration system. For instance, a person who has traveled from abroad may use their phone to connect to the network. In such a situation, the device first connects to the network before the person registers the device with the centralized identity registration system. In such situations, the local identity system can check a status of the device identifier of the device in the local identity system. Depending on the status of the device identifier, the local identity system may apply certain restrictions on the device's rights to access the network. Furthermore, the local identity system can provide the device identifier to the centralized identity registration system such that the centralized identity registration system can determine if the device is authentic or if the device is a duplicate or counterfeit. Depending on the authenticity of the device, the centralized identity registration system can take certain measures and assign the device identifier of the device to either the whitelist, graylist or blacklist in the centralized database.

Figure 1B:
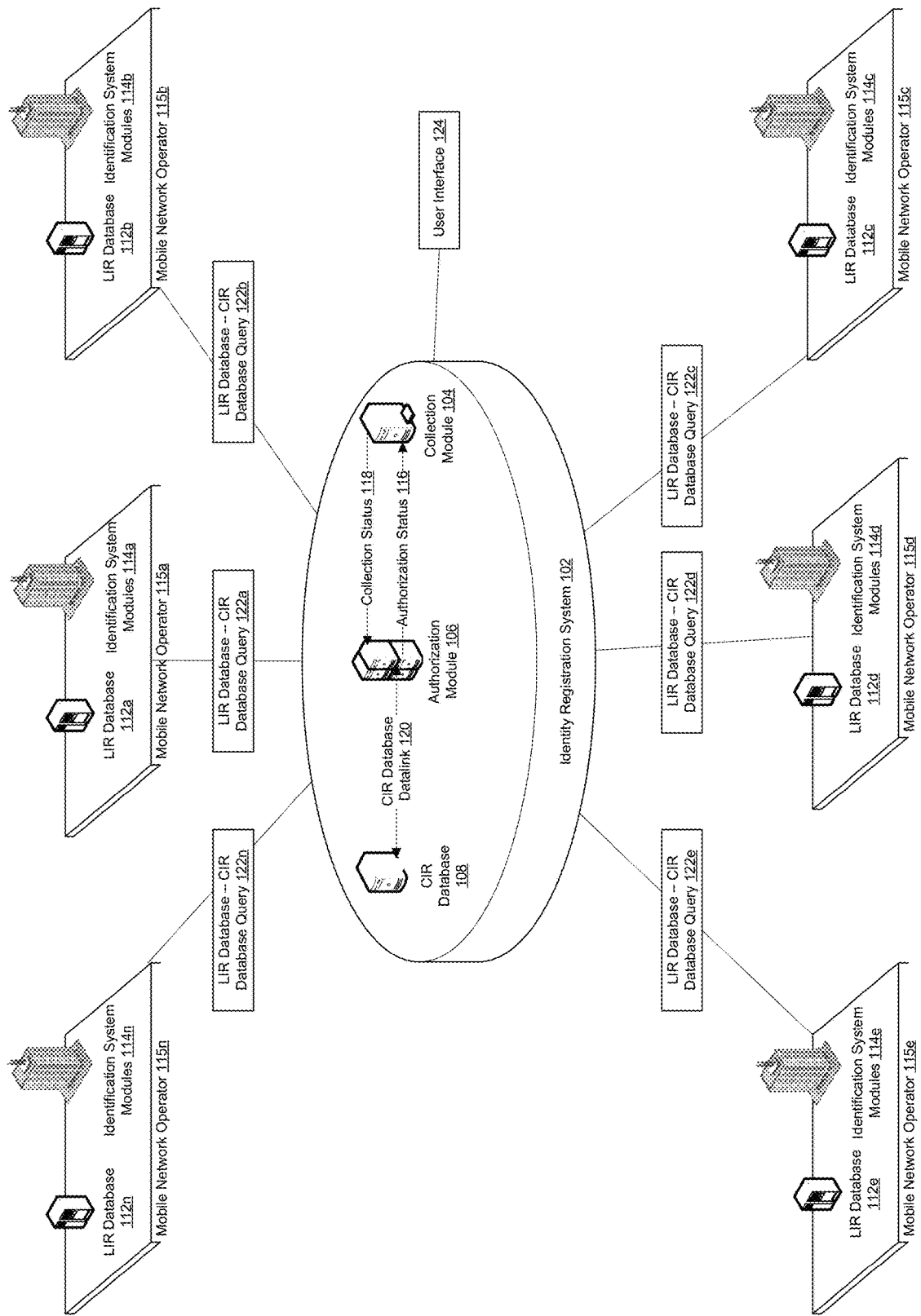
FIG. 1B illustrates a networked implementation of the device detection and registration system for aggregating device registrations to one or more databases according to embodiments of the present disclosure.
Figure 1C:
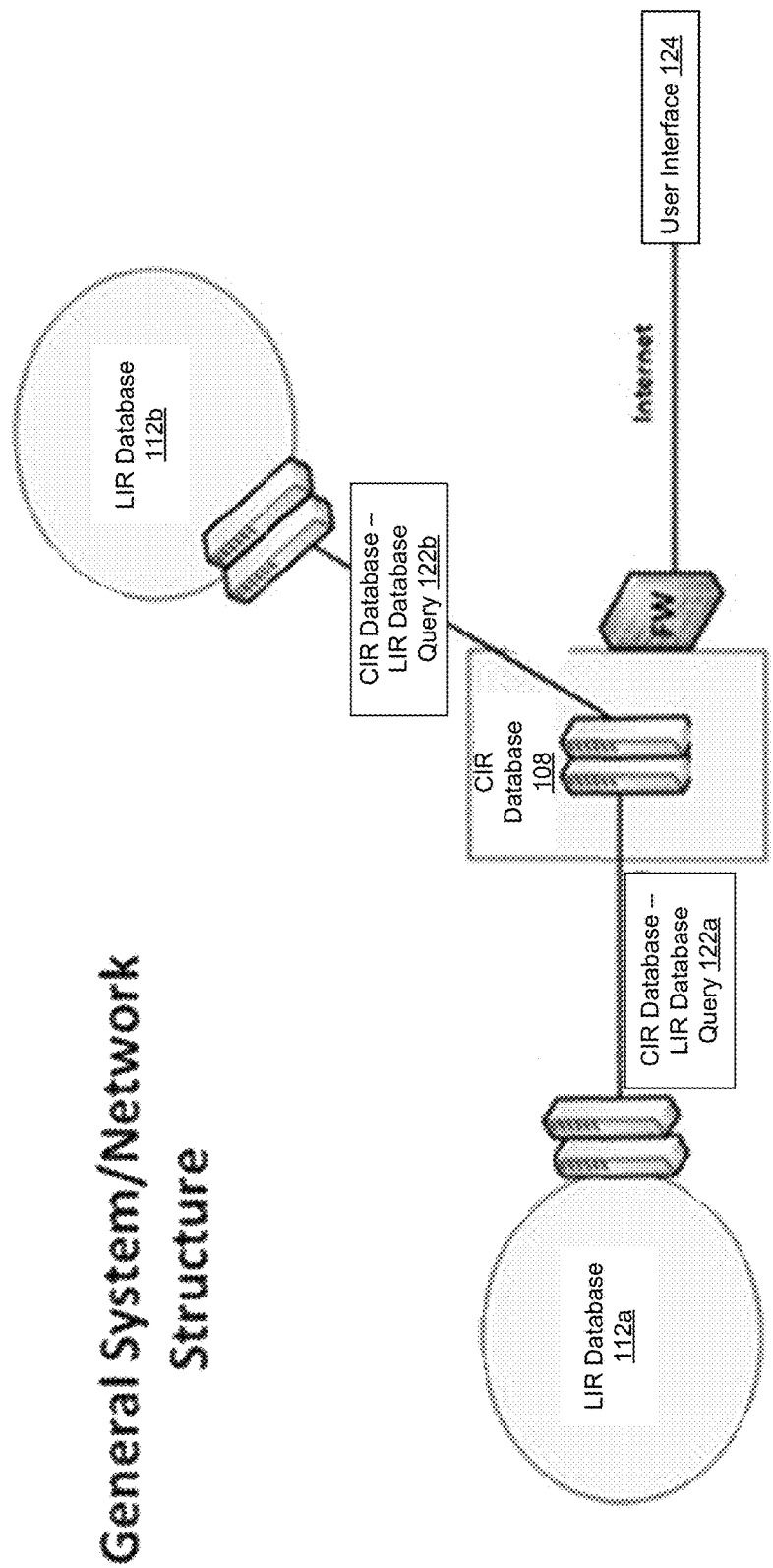
FIG. 1C illustrates an exemplary networking implementation of the data processing system for aggregating device registrations to one or more databases according to embodiments of the present disclosure.

The present disclosure relates to systems and methods for device detection and registration. Referring now to FIGS. 1A, 1B, and 1C, FIG. 1A illustrates a device detection and registration system 100. FIG. 1B illustrates a networked implementation of the device detection and registration system for aggregating device related information and including devices in one or more databases. FIG. 1C illustrates an exemplary networking implementation of the data processing system for aggregating device registrations to one or more databases. The device detection and registration system 100 can include the identity registration system 102. The identity registration system 102 can include a collection module 104, an authorization module 106, and a central identity registration (CIR) database 108. The device detection and registration system 100 can include one or more mobile network operators 115a-115n (generally referred to as mobile network operator 115). One or more local identification systems 110a-110n (generally referred to as local identification system 110) can be installed on or be controlled or managed by corresponding mobile network operators 115. The local identification systems 110a-110n can include local identity registration databases 112a-112n (generally referred to as local identity registration (LIR) database 112 and identification system modules 114a-114n (generally referred to as identification system module 114). The device detection and registration system 100, the identity registration system 102, the collection module 104, the authorization module 106, the local identity system 110 and the identification system modules 114 can be any script, file, program, application, set of instructions, or computer-executable code that is configured to perform the functionality described herein. Additional details relating to each of the components described above are provided below.

The identity registration system 102 can be configured to manage the status and authorization of electronic communications devices for connecting to one or more telecommunications networks within a jurisdiction. The identity registration system 102 can be configured to provide a platform through which importers can provide a list of electronic devices for permission to attach to the one or more telecommunications networks. The identity registration system 102 can further be configured to determine the authenticity of the electronic devices included in the list as well as determine whether taxes related to the electronic devices included in the list have been paid. In some embodiments, the identity registration system 102 can be configured to collect unpaid taxes or other duties, fees, or amounts on the electronic devices. Upon authorization, the identity registration system 102 can store information relating to each electronic device on the CIR database 108 including information pertaining to amounts paid for the device as well as device identifier information used to determine the authenticity of the device. The identity registration system 102 can further be configured to classify or group each of the electronic devices into one or more group or lists. These lists can be used to determine whether the electronic device is authorized to access the one or more telecommunications network. In some embodiments, the lists can include a whitelist, a graylist and a blacklist. Additional details regarding these lists and the restrictions or permissions associated with these lists are provided herein.

In some embodiments, the identity registration system 102 can provide a user interface through which importers can pay taxes on devices that they've imported and request to authorize the devices to access one or more networks. In some embodiments, the collection module 104 can first receive a request from an importer to pay taxes on a list of devices to register. The collection module 104 can then determine, from the list of devices, an amount to be collected from the importer based on one more collection policies. In some embodiments, the collection module 104 can communicate with the authentication module 106 to determine the amount to be collected based on the authentication of the devices. The collection module 104 may provide the calculate amount to the importer for collection and responsive to providing the calculated amount, may receive a payment from the importer. In some embodiments, the importer may have previously paid taxes or may pay taxes through another portal in which case, the importer may provide a reference identifier indicating that the taxes have been paid. The collection module 104, upon receiving payment or receiving evidence that payment has been made, can generate a collection status for each device (or device identifier) indicating that taxes for the device have been paid. The authorization module 106 can determine the authenticity of the device and assign an authentication status to the device (or device identifier) indicating if the device is genuine, original, duplicative or fake. Based on the collection status and the authentication status, the identity registration system 102 can assign the device identifier to a particular group of a plurality of groups in the CIR database 108. The plurality of groups can include a whitelist group, a graylist group and a blacklist group. Device identifiers in the whitelist can permanently access the network, device identifiers in the graylist can temporarily access the network, and device identifiers in the blacklist cannot access the network. Additional details regarding this system are provided below.

As briefly mentioned above, the identity registration system 102 can receive, from a client associated with a first entity, a device identifier of a first device. The client can be a client device of a first entity, such an importer or a retailer of electronic devices. In some embodiments, the identity registration system 102 can provide a user interface 124, via which the identity registration system 102 can receive a list of electronic devices from a client device of the first entity that wants to authorize or register the electronic devices. In some embodiments, the first entity can access a portal provided by the identity registration system 102 via a client device, and provide the list of electronic devices to register or authorize via a user interface provided via the portal. The list of electronic devices can include a list of device identifiers identifying the electronic devices. The device identifier can include a subscriber identification module (SIM) card number or an international mobile equipment identity number (IMEI). Different versions of the IMEI can be supported, such as 14, 15, and 16 digit IMEIs.

The collection module 104 of the identity registration system 102 can be configured to receive payment relating to the device identifiers included in the list of device identifiers the first entity is requesting to authorize. The collection module 104 can process payments received from the first entity and responsive to processing the payment for each device identifier included in the list, assign a collection status to the device identifier of the device. The collection status 118 can be a tag, one or more bits, or any other indicator that can be used by the collection module 104 or the identity registration system 102 to determine that payment for the device has been received and processed. The collection module 104 can include payment data for each device. For each device brought into a jurisdiction, the collection module 104 can process or collect the payments of taxes and duties, either by importation or for personal use. The jurisdiction can be a region, country, or predetermined area. The collection module 104 can receive data for a device such as its device identifier. The collection module 104 can receive a single device or a batch of devices. The collection module 104 can receive importer data such as their authorizing entity identity number, name, company name, date, device model, and device identifier. The collection module 104 can receive payments via the user interface 124. Responsive to the collection module 104 processing payment of a list of devices, the collection module 104 can transmit the collection status 118 of the list of devices or device identifiers of the devices to the authorization module 106.

The authorization module 106 can be configured to verify if a device identifier of a device corresponds to either an original device that is not duplicative, a device having a duplicative device identifier, or a device having a fake device identifier. The authorization module 106 can determine that a device is original if the device identifier is unique and also found in a global database of device identifiers maintained by a standards organization. In some embodiments, the authorization module can determine that a device is original if the device identifier of the device is readable by a mobile network operator, generated by a legitimate manufacturer or regulatory entity, and capable of being processed by the mobile network operator. The authorization module 106 can determine that the device identifier is duplicative if the device identifier of the device is identical to another device identifier that is currently connected to the network. For example, for a first device and a second device connected to the network, the authorization module 106 can determine that both devices are duplicative if the device identifier of the first device is identical to the device identifier of the second device, but a SIM number or phone number of the first device is different from the SIM number or phone number of the second device. In some embodiments, the authorization module 106 can determine that a device has a duplicative device identifier if the device identifier matches another device identifier already stored in the CIR database 108 if the device is being registered by an importer through the identity registration system 102. The authorization module 106 or the identity registration system 102 can determine that both devices are duplicative if the device identifier of the first device is identical to the device identifier of the second device, but a phone number of the first device is different from the phone number of the second device.

The authorization module 106 or identity registration system 102 can determine that the device is fake if the device identifier is not found in the global database of device identifiers maintained by the standards organization or if the device specifications associated with the device identifier do not match the device specifications of the device (such as the type allocation code of the device) being verified by the authorization module 106. It should be appreciated that the authorization module 106 can apply one or more rules or policies to determine whether a device is authentic, duplicative or fake.

Responsive to the authorization module 106 verifying that the device is original, the authorization module 106 can transmit instructions or notify the collections module that the device is original. The collection module 104 can then either request payment for the device or process a payment on the device. Responsive to the collection module 104 processing the payment on the device, the authorization module 106 or the identity registration system 102 can assign an authorization status 116 to the device identifier of the device and assign the device identifier to a whitelist maintained in the CIR database 108. The authorization status 116 can be a tag, one or more bits, or any other indicator that can be used by the authorization module 106 or the identity registration system 102 to indicate that the device is authentic and original. In some embodiments, the identity registration system 102 can transmit to the first entity, one or more instructions indicating that the device identifier of the first device is authorized. The authorization module 106 may not assign the authorization status 116 to devices that are either fake or duplicative.

Responsive to the authorization module 106 verifying that the device is duplicative, the authorization module 106 can transmit instructions or notify the collections module that the device is duplicative. Responsive to the authorization module 104 verifying that the device is duplicative, the authorization module 106 or the identity registration system 102 can assign the device identifier of the duplicative device to either a graylist or a blacklist maintained in the CIR database 108. In some embodiments, depending on the policies established by the entity maintaining the identity registration system 102, the device identifier of the duplicative device can be assigned to the whitelist for a predetermined period of time.

Responsive to the authorization module 106 verifying that the device is fake, the authorization module 106 can transmit instructions or notify the collections module 104 that the device is fake. Responsive to the authorization module 104 verifying that the device is fake, the authorization module 106 or the identity registration system 102 can assign the device identifier of the duplicative device to either a graylist or a blacklist maintained in the CIR database 108.

Devices that are either fake or duplicative can be identified and processed as per the jurisdiction's specifications. In some embodiments, the authorization module 106 or the identity registration system 102 can assign the device to the graylist or the blacklist based on the time spent by a device lacking the authorization status 116 (i.e. the device is duplicative or fake). For example, a duplicative or fake device may be allowed to access the networks for a predetermined amount of time before the device is permanently blocked from accessing the networks and reported as an illegal device.

In situations where the authorization module 106 determines that a device identifier is original, the authorization module 106 can transmit the authorization status 116 of the device identifier to the collection module 104. The collection module 104 can receive the authorization status 116. The collection module 104 can transmit a reply to the authorization module 106 with a collection status 118 for the device. In some implementations, the collection module 104 generates the collection status 118 for being compliant with payment regulations responsive to the device identifier being identified as original.

Responsive to the collection module 104 receiving payment on a device identifier or the list of device identifiers, the collection module 104 can generate an event record. The event record can correspond to a transaction event indicating payment for the device identifier. The event record can include the device identifier, an amount of payment of taxes or duties associated with the device identifier, and a first event identifier identifying the transaction event. The first event identifier can be a reference, such as a transaction number or identifier, to the payment. The collection module 104 can store the relevant amount of taxes and duties paid for the device identifier. In some embodiments in which the importer or retailer made payment for the device identifiers via a separate payment system, the identity registration system 102 can receive the event record of the transaction event from the importer or retailer via the user interface. In some embodiments, the identity registration system 102 can generate the event record of the transaction event using data received from the first entity via the user interface.

In some embodiments, the collection module 104 may detect a fraudulent transaction or improper transaction. In such situations, the collection module 104 may flag the device identifier corresponding to the fraudulent or improper transaction. For instance, the collection module 104 can remove the collection status 118 for a particular device identifier. The collection module 104 can compare the relevant amount of taxes and duties paid by the device to the expected amount of taxes and duties paid by the device. The collection module 104 can remove the collection status 118 for a particular device identifier responsive to determining that the amount paid does not match the expected amount of taxes and duties for the device. The collection module 104 can transmit the device identifier, relevant amount of taxes and duties paid, and the transaction reference numbers to the authorization module 106.

Responsive to the collection module 104 and the authorization module 106 verifying the device identifier and any associated payments for the device identifier, the authorization module 106 or the identity registration system 102 can store data associated with the device identifier in the CIR database 108. The CIR database 108 can communicate with the authorization module 106 and the collection module 104. The authorization status 116 and collection status 118 can both be transmitted to the CIR database 108 via the CIR database datalink 120. The CIR database 108 can receive the authorization status 116 and the collection status 118 from the authorization module 106 and the collection module 104. The CIR database 108 can receive the data of the authorization module 106 and the collection module 104 via CIR database datalink 120. The data associated with the device identifier in the CIR database can include the device identifier, the authorization status 116 of the device identifier and the collections status 118 of the device identifier. In some embodiments, the identity registration system 102 can store for each device identifier included in the list of device identifiers provided by the importer or retailer, a corresponding entry in the CIR database. The entry can include the device identifier, the amount of taxes paid, the corresponding event identifier, a specification of the device, and the authorization status indicating that the device is authorized. In some embodiments, for each device, the CIR database 108 can store the device identifier, relevant amount of taxes and duties paid, and the transaction reference numbers generated by the collection module 104. In some embodiments, for each device, identity registration system 102 can store, in the CIR database 108, an indication that the device is original, duplicative or fake, device specification data, and an indication of whether taxes and duties have been paid on the device.

The identity registration system 102 can assign each device identifier stored in the CIR database 108 into at least one of a plurality of groups. The identity registration system 102 can assign the device identifiers based on whether the device is original, duplicative or fake and whether taxes have been paid on such devices. The first group of the plurality of groups can be a whitelisted group of device identifiers. Each device identifier of the first group can be permanently allowed to access one or more networks via one or more mobile network operators. The second group can be a graylist and includes device identifiers that are temporarily allowed to access the one or more networks. Device identifiers on the graylist can be allowed to access the network for a certain period of time. The third group can be a blacklist and includes device identifiers that are permanently blocked from accessing the one or more networks.

As shown in FIGS. 1A and 1B, the identity registration system 102 can communicate with a respective local identification system 110 of each of the one or more mobile network operators 115. The local identification system 110 can be installed on the mobile network operator 115. The local identification system 110 can include the LIR database 112 and the identification system module 114. The local identification system 110 can provide networking services to the devices. Responsive to determining that a device accesses the network of the mobile network operator 115 associated with the local identification system 110, the local identification system 110 can determine whether or not the device can register with the mobile network operator to maintain access to the network.

Each local identification system 110 can be configured to receive information relating to one or more device identifiers from the identity registration system 102. The LIR database 112 and the CIR database 108 can communicate via LIR database—CIR database queries 122a-122n (generally referred to as LIR database—CIR database query 122). The LIR database—CIR database query 122 is configured to share data via a communication channel. The communication channel can be a networked API, direct database replication between the CIR database 108 and the LIR database 112, or data streaming between the CIR database 108 and the LIR database 112. In some embodiments, the LIR database—CIR database query 122 can communicate via two or more switches of 1 Gigabyte for port redundant connectivity. A switch can be a 1 Gigabyte switch, a 2 Gigabyte switch or any switch capable of transferring data between the CIR database 108 and the LIR database 112. The identity registration system 102 can transmit the data associated with the device from the CIR database 108 to the LIR database 112 via the LIR database-CIR database query 122. In some embodiments, the CIR database 108 and the LIR database 112 can be configured to exchange information periodically or may maintain a live real-time connection such that any changes made to the CIR database 108 can be shared with one or more LIR database 112 and vice versa.

In some embodiments, the CIR database 108 of the identity registration system 102 and each LIR database 112 can be configured to store device related information such that the LIR database 112 may maintain at least a portion of the information maintained in the CIR database 108. In some such embodiments, the portion of the information may include data relating to device identifiers associated with the mobile network operator 115 associated with the particular LIR database 112. In some embodiments, the LIR database 112 can be configured to maintain all of the information maintained in the CIR database 108. Each LIR can maintain a list of device identifiers and associate each device identifier to one of a whitelist, graylist, or a blacklist. The list to which each device identifier is assigned is determined from the CIR database 108.

In some embodiments, identity registration system 102 can analyze the device identifier 208 on the LIR database 112. For example, the identity registration system 102 can receive, from the first system, data corresponding to a second device identifier of a second device, the data corresponding to the second device identifier stored in the second set of databases. The first set of databases can be the CIR database 108, and the second set of databases can be the LIR databases 112.

As described above, the device detection and registration system 100 can receive device identifiers from importers or retailers via the identity registration system 102 to register devices corresponding to the device identifiers with the identity registration system 102. The device detection and registration system 100, however, can also receive device identifiers of devices responsive to such devices connecting to one or more networks of the mobile network operators 115. Such devices may not be registered at the time the devices are imported or sold. Accordingly, the device detection and registration system 100 is configured to register such devices upon detecting that these devices access the one or more networks.

A device can access a network of a mobile network operator 115 that is associated with a local identification system 110 in communication with the identity registration system 102. Responsive to the device accessing the network, the device can be discovered by the local identification system 110 of the mobile network operator 115. For example, a device undeclared with the collection module 104 of the identity registration system 102 will be discovered by the local identification system 110 when the device attempts to connect to the network of the MNO. In some implementations, the local identification system 110 can detect the device once the device connects to the network of the mobile network operator 115.

Figure 2A:
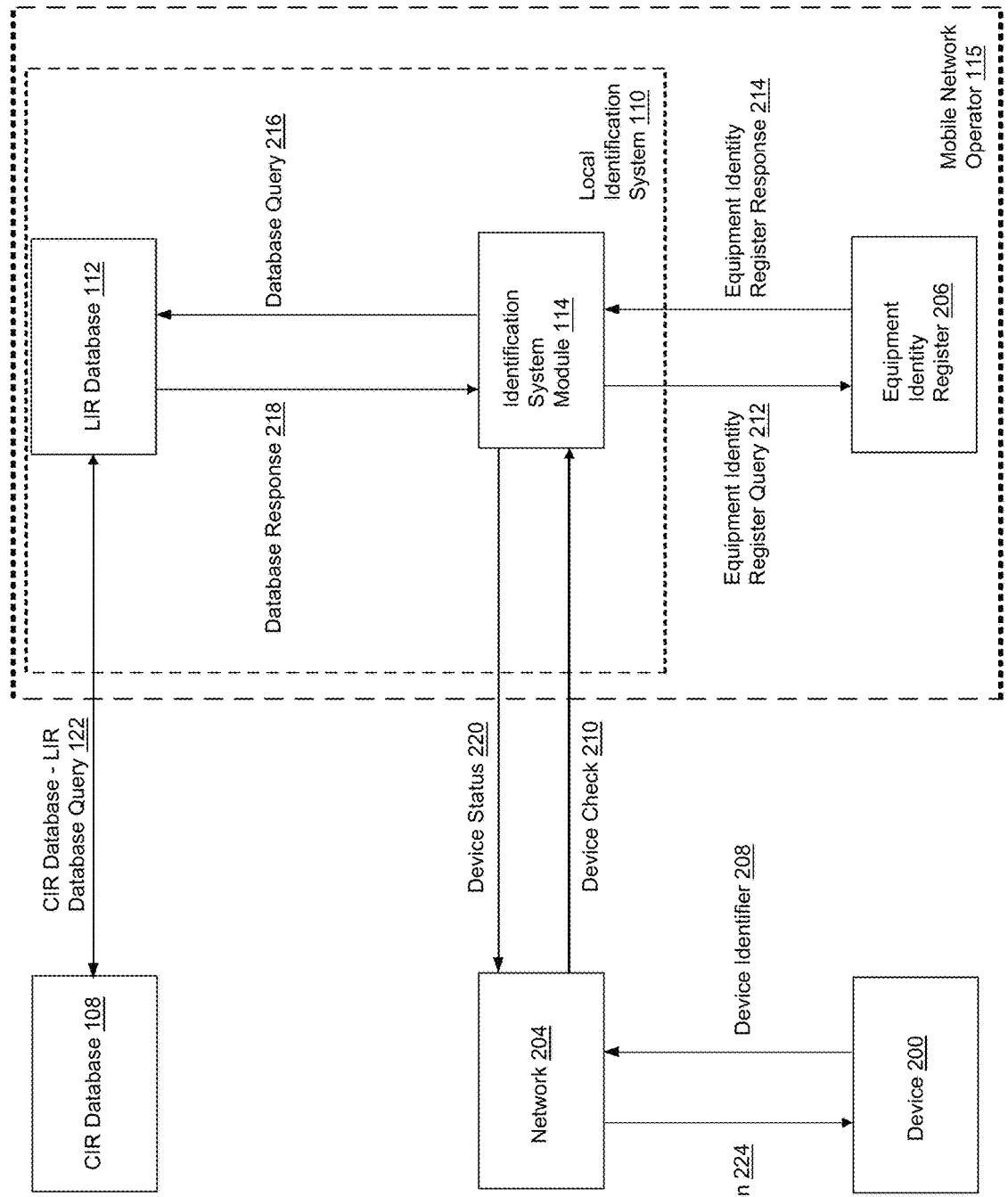
FIG. 2A illustrates an implementation of the device detection and registration system with an equipment identity register installed on the mobile network operator.
Figure 2B:
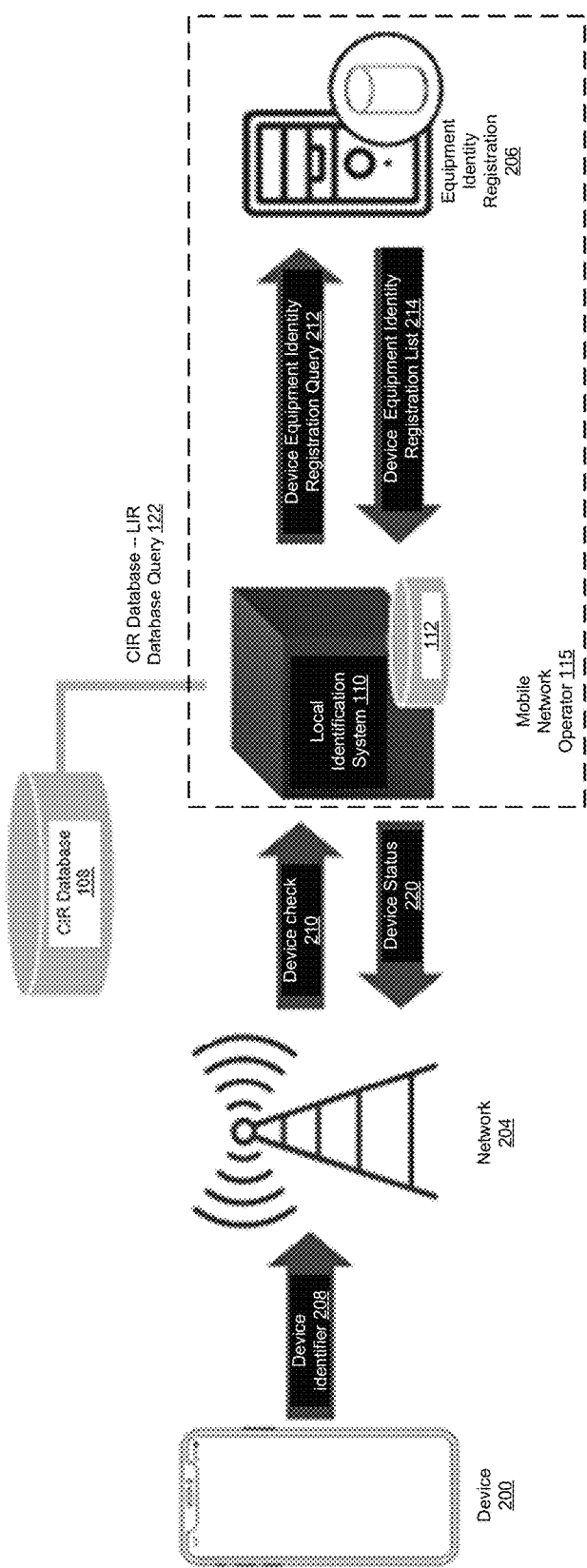
FIG. 2B illustrates a flow of packets corresponding to the implementation shown in FIG. 2A.
Figure 2C:
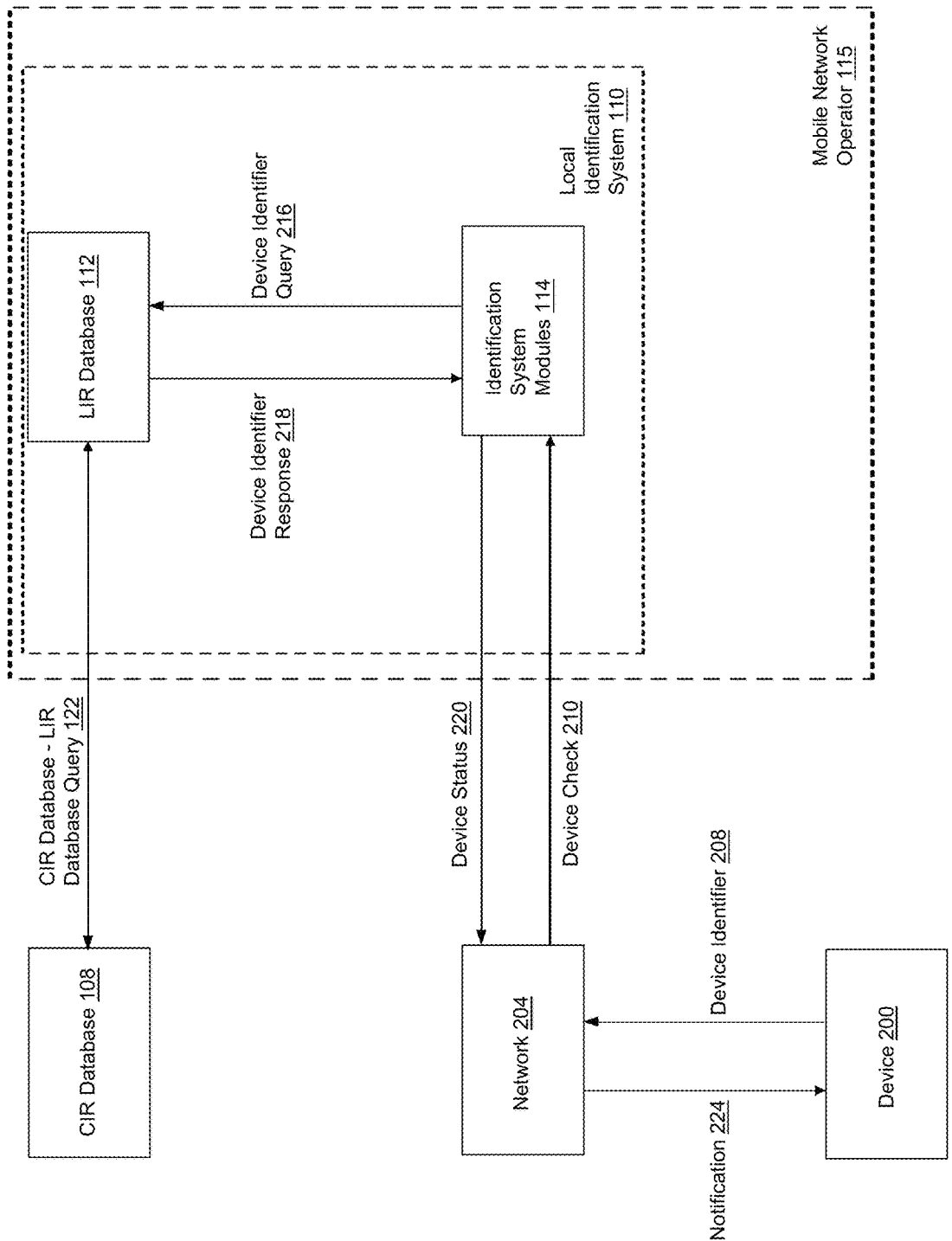
FIG. 2C illustrates an implementation of the device detection and registration system without an equipment identity register.

The identification system module 114 of the local identification system 110 can receive a request to check the device identifier of the device. Responsive to the device connecting to the network, the request can be transmitted by the network to the local identification system 110 of the mobile network operator 115. The identification system module 114 can query the device identifier in the LIR database 112. The identification system module 114 can look up the device identifier in the LIR database 112 and can determine that the device identifier is assigned to one of a whitelist, a graylist, or a blacklist. As described above, the LIR database 112 is communicatively coupled to the CIR database 108 and receives the assignment of device identifiers from the CIR database 108. In some embodiments, if the device identifier is not included in the LIR database 112, the identification system module 114 can be configured to assign the device identifier to one of a whitelist, a graylist, or a blacklist. In some embodiments, the identification system module 114 can be configured to determine which list to assign the device identifier based on one or more policies. In some embodiments, the one or more policies can be provided to the identification system module 114 by the identity registration system 102. In this way, instead of the identification system module 114 sending a request to the identity registration system 102 to determine which list to assign the device identifier, the identification system module 114 can make the determination based on the one or more policies. Depending on which list the device identifier is assigned to, the local identification system 110 will manage the device's ability to access the network 115. Upon assigning the device identifier to a particular list, the LIR database 112 can communicate the assignment to the CIR database 108 such that the CIR database 108 also includes the device in the appropriate list. The CIR database 108 can then share the update to the appropriate list with one or more other LIR databases 112 responsive to the CIR database 108 being updated. FIG. 2A-2C provide additional details relating to the assignment of the device identifiers in the CIR database 108 or the LIR database 112.

Further, in the event that the device identifier is not included in the LIR database 112 or the CIR database 108, the local identification system 110 can process the device identifier and update the LIR database 112 with the device detected by the local identification system 110. The data stored in the LIR database 112 can then be shared or communicated to the CIR database 108, such that the CIR database is also updated to include the device identifier processed by the local identification system 110. The data transmitted from the LIR database 112 to the CIR database 108 can include details relating to the device identifier, including one or more secondary device identifiers, for instance, a SIM card number or a phone number in addition to device specification information. The identity registration system 102 can analyze the data relating to the device identifier and include the device identifier in the CIR database 108 using the data received from the LIR database 112 to determine if any other restrictions or permissions can be assigned to the device identifier and can determine to assign the device identifier to a different list from the whitelist, graylist or blacklist, depending on any additional data received by the identity registration system 102.

As a result of the systems and methods described herein, the present disclosure describes systems capable of enforcing compliance of a jurisdiction's regulations and ensuring collection of payments incurred on all devices entering the country. The system can process payments of all devices brought into the country, either by importation or for personal use. The system can authorize the devices based on an authorization process and categorize them based on data obtained by the system. The device validation data can be distributed to mobile network operators. Using the device data, the mobile network operators can then ensure that its mobile devices are compliant with the jurisdiction's rules and regulations.

Referring now to FIGS. 2A-2C, FIG. 2A illustrates an implementation including the LIR database 112, the local identification system 110, an identification system module 114, a mobile network operator 115, a device 200, a network 204, and an equipment identity register 206 installed on the mobile network operator 115. In some embodiments, the equipment identity register 206 can be installed by a third party entity unrelated to an entity managing the identity registration system 102. FIG. 2B illustrates a flow of packets corresponding to the implementation shown in FIG. 2A of the device detection and registration system 100 with an equipment identity register 206 installed on the mobile network operator 115. The equipment identity register 206 can include device identifier information indicating whether a device identifier corresponds to a device that is stolen, fake or authentic. The equipment identity register 206 can maintain a separate group of lists including device identifiers. The group of lists can include the whitelist, graylist, or blacklist.

As shown in FIGS. 2A and 2B, the local identification system 110 is communicatively coupled to both the equipment identity register 206 and the identity registration system 102. In such implementations, responsive to a device connecting to the network 110, the network generates a device check request 210 that is transmitted to the local identification system 110. To determine the assigned list of the device identifier 208, the identification system module 114 can submit an equipment identity register query 212 to the equipment identity register 206 and a separate database query 216 to the LIR database 112. The equipment identity register query 212 and the database query 216 can include the device identifier 208. The equipment identity register 206 can look up the device identifier 208 and can reply to the equipment identity register query 212 with an equipment identity register response 214. The equipment identity register response 214 can indicate that the device identifier 208 is on the whitelist, the graylist, the blacklist, or the unknown list as maintained by the equipment identity register 206. Similarly, the identification system module 114 can query the device identifier 208 in the LIR database 112 and receive a database response 218 to the database query 216. The LIR database 112 stores the list assignments of the device identifier 208. For example, the identity registration system 102 can receive, from the first system, data corresponding to a second device identifier of a second device, the data corresponding to the second device identifier stored in the second set of databases. The first set of databases can be the CIR database 108, and the second set of databases can be the LIR database 112. The LIR database 112 can transmit the data associated with the plurality of device identifiers to the CIR database 108 via the LIR database—CIR database query 122. The database response 218 can indicate that the device identifier 208 is on the whitelist, the graylist, the blacklist, or the unknown list as maintained in the LIR database 112 and the CIR database 108. Similarly, the identity registration system 102 can look up the device identifier 208 and can reply to the database query 216 with the database response 218. The database response 218 can indicate that the device identifier 208 is on the whitelist, the graylist, the blacklist, or the unknown list as maintained by the CIR database 108.

In some embodiments, the LIR database 112 can be configured to provide a database response 218 responsive to either the database query 216 or any other query transmitted from the identification system module 114. Although the database response 218 was generated based on the device connecting to the network, the response 218 can be generated responsive to a query generated because the mobile number associated with the device was changed or an identifier of the device associated with the network 204 was changed.

To determine a device status 220 based on the equipment identity register response 214 and the database response 218, the local identification module 114 can compare the equipment identity register response 214 to the database response 218. If the equipment identity register response 214 and the database response 218 are identical, then the identification system module 114 can assign the device status 220 based on either response in accordance with a priority policy. The identification system module 114 can then transmit the device status 220 to the network 204.

The priority policy can include one or more rules according to which to determine the correct device status of the device. For instance, if there is a discrepancy between the equipment identity register response 214 and the database response 218, the identification system module 114 can prioritize the equipment identity register response 214 over the database response 218 based on the priority policy. For example, if the equipment identity register response 214 indicates that the device identifier is on the graylist and the database response 218 indicates that the device identifier is on the whitelist, the identification system module 114 can determine that the device status 220 of the device identifier 208 is graylist, that is, the device is to be treated as if it is in on the graylist.

In some embodiments, the identification system module 114 can prioritize the database response 218 over the equipment identity register response 214 based on the priority policy. For example, if the equipment identity register response 214 indicates that the device identifier is graylisted and the database response 218 indicates that the device identifier is whitelisted, the identification system module 114 can determine that the device status 220 of the device identifier 208 is whitelist, that is, the device is to be treated as if it is in on the whitelist.

In some embodiments, the priority policy can include rules to prioritize a blacklist over a graylist, and a graylist over a whitelist. For example, if the equipment identity register response 214 indicates that the device identifier is on the graylist and the database response 218 indicates that the device identifier is on the whitelist, the identification system module 114 can determine that the device status 220 of the device identifier 208 is graylist, that is, the device is to be treated as if it is in on the graylist.

The priority policy can be set by the identity registration system 102, an operator, authorization agency, authorizing entity, or payment agency. In some embodiments, the priority policy can be based on stored on each local information system 110 for use by the respective identification system module 114 and can be provided by the identity registration system 102.

Now referring to FIG. 2C, and in brief overview, depicted is an implementation of the device detection and registration system 100 without the equipment identity register 206 shown in FIGS. 2A and 2B. The implementation includes the CI R database 108, the mobile network operator 115 including the local identification system 110, a device 200, a network 204, and an identification system module 114. Unlike the implementations described in FIGS. 2A and 2B, in this implementation, the identification system module 114 transmits a database query 216 to the LIR database 112 and determines the device status 220 based on the database response 218 without relying on any information maintained in the equipment identity register 206 shown in FIGS. 2A and 2B. The identification system module 114 can then transmit the device status 220 to the network 204, and the local identification system 110 can transmit a notification 224 based on the device status 220 to the device 200. The device status 220 can include the list designation, such as whitelist, graylist, blacklist, or unknown, of the device identifier 208.

The device detection and registration system 100 can be configured to be implemented in two phases. The first phase can correspond to an observation period during which the device detection and registration system 100 monitors network activity across multiple networks of mobile network operators and implements some network restrictions on devices accessing the one or more networks, without waiting for the completion of data collection during the observation period. The second phase can correspond to an enforcement period during which the device detection and registration system 100 continues to monitor network activity across multiple networks of mobile network operators and implements further network restrictions, based on data collected during the observation period and enforcement period, on devices. A device identifier 208 can be assigned to different network restrictions during the observation period and the enforcement period. The length of the observation period has can be defined by the authorizing entity for the registration of each device 200 within a jurisdiction. The observation period can be one or several months. Once the observation period is completed, the enforcement period can begin and can last until the authorizing entity decides to terminate the services provided by the device detection and registration system 100. Therefore, during both the observation period and enforcement period, when the device 200 connects to the network 204, the identification system module 114 receives a device check request 210 from the network 204.

The identity registration system 102 collects data associated with each device 200 that is connected to each mobile network operator 115 during the observation period. The data obtained during from the observation period may complement existing data, such as data received from the collection module 104. The observation period is to collect data on each device 200 connected to each network 204. During the observation period, the identity registration system 102 is detecting and registering devices via each network 204. However, the system can be configured to block or restrict devices determined to not comply with one or policies during the observation period, without waiting for the completion of data collection during the observation period. The data can be collected from each network 204 by the identity registration system 102 via the local identification system 110. The length of the observation period and the restrictions and blocking during the observation period can be defined by the authorizing entity for the registration of each device 200 within a jurisdiction. The observation period can be one or several months.

During the observation period, the identity registration system 102 can, from each LIR database 112 of the respective local identification systems 110 of the mobile network operators 115, collect data on each device identifier 208 based on an observation policy. The observation policy can include a set of rules that can determine if and how data can be collected from the device identifier 208. The observation policy can be based on GSMA standards or regulatory standards. If data can be collected from the device identifier 208 and the device identifier 208 is compatible with the network 204, then the identity registration system 102 assigns the device identifier 208 to a whitelist. During the observation period, each identification system module 114 will populate and register each device identifier 208 that is connected to the corresponding network 204. Each respective identification system module 114 can also receive, a history of each device identifier 208 that has connected to the corresponding network 204 over a time period. The time period can be several months or several years. The identification system module 114 can access data associated with the device identifier 208 via the network 204. Importers can provide the list of each device identifier 208 for each device 200 that is imported to an area or country before the start of observation period.

During the observation period, the identification system module 114 analyzes each device identifier 208 by submitting a database query 216. The identification system module 114 can submit the database query 216 responsive to receiving a device check request 210. In some embodiments, the device check request 210 is received responsive to the device 200 connecting to any network 204, changing its mobile number, or changing its identifier with the network 204. Responsive to submitting the database query 216, the identification system module 114 determines a database response 218 indicating that the device identifier 208 is on a particular list based on the observation policy and the data collected for that device identifier 208. This is similar to the process described in FIGS. 2A-2C.

During the observation period, the identity registration system 102 or the local identification system 110 of the corresponding network to which the device connects can assign the device identifier 208 to the whitelist responsive to the device identifier 208 having an authorization status 116 and a collection status 118. The identity registration system 102 or the local identification system 110 can assign the device identifier 208 to the whitelist responsive to the device identifier 208 not having an authorization status 116. The identity registration system 102 or the local identification system 110 can also assign the device identifier 208 to the whitelist responsive to the device identifier 208 being duplicative but not presently connected to any network 204. In some embodiments, the identity registration system 102 or the local identification system 110 can assign the device identifier 208 to the blacklist responsive to the device identifier 208 not having an authorization status 116, being duplicative, and presently connected to one of the networks 204. For example, a first combination including the device identifier 208 associated with a first MSISDN can be assigned to the whitelist, but a second combination including the device identifier 208 and a second MSISDN will be assigned to the blacklist. Assigning the second combination to the blacklist can prevent the device identifier 208 associated with the second MSISDN from accessing the network 204.

The identity registration system 102 or the local identification system 110 can assign the device identifier 208 to the whitelist responsive to the device identifier 208 having a zero value or null value and not being authentic.

The identity registration system 102 or the local identification system 110 can assign the device identifier 208 to the whitelist responsive to the device identifier 208 not having a collection status 118.

In some embodiments, the identity registration system 102 or the local identification system 110 can assign the device identifier 208 to the graylist responsive to the device identifier 208 not having an authorization status 116 and not being authentic. The identity registration system 102 or the local identification system 110 can assign the device identifier 208 to the graylist responsive to the device identifier 208 not having an authorization status 116 and being duplicative.

If the device identifier 208 data is unavailable or unable to be collected, then the identity registration system 102 or the local identification system 110 matches the device identifier 208 with a secondary device identifier of the device 200. For example, identity registration system 102 matches the International Mobile Equipment Identity ("IMEI") and the International Mobile Subscriber Identity ("IMSI") of the SIM card inserted into the device 200, and this new pair IMSI-IMEI will be assigned to a graylist. The secondary device identifier can allow the identity registration system 102 or the local identification system 110 to identify the device 200 if its device identifier 208 is unavailable. For example, the IMSI enables the identity registration system 102 or the local identification system 110 to identify properly the device 200, especially when it's IMEI is something common for non-standard mobile devices, such as 00000000000000. If a device 200 has a plurality of device identifiers, each device identifier 208 can be detected and stored in the identity registration system 102. Each device identifier 208 can be stored in the identity registration system 102. The identity registration system 102 can receive, data corresponding to a plurality of device identifiers for each device of a plurality of devices. The plurality of device identifiers can be received by the CIR database 108 from the LIR database 112 in response to a database query 216.

The identity registration system 102 can analyze the plurality of device identifiers. The identity registration system 102 can determine that each device identifier of the plurality of device identifiers corresponds to at least one of a i) duplicate device identifier, ii) a fake device identifier, iii) a fake declaration of specifications or duties due for the device identifier, or iv) an indication that a transaction event identifying the device identifier has not been processed. A duplicate device identifier is associated with more than one device. A fake device identifier cannot be compatible with the network or the device. A fake declaration of specifications can specify invalid parameters of the device. A fake declaration of specifications can be caused by a fake type allocation code. A fake declaration of duties can be an invalid authorization form provided to the collection module 104. An indication that a transaction event has not been processed can be based on the device identifier not receiving a collection status 116.

The identity registration system 102 can analyze whether each device identifier of the plurality of device identifiers is authentic, duplicative, assigned an authorization status 116, or assigned a collection status 118. The identity registration system 102 can store, in the set of databases, an entry identifying the device identifier and a status indicating that the device is unauthorized. The identity registration system 102 can store the entry and the status in the CIR database 108. The identity registration system 102 can store an indication that the device 200 is unauthorized in the CIR database 108. In some embodiments, the identity registration system 102 can store, in the CIR database 108, an entry identifying the device identifier and a status indicating that the device is unauthorized responsive to determining that the device identifier corresponds to at least one of i) the duplicate device identifier, ii) the fake device identifier, iii) the fake declaration of specifications of the device, or iv) the indication that the transaction event identifying the device has not been processed. The identity registration system 102 can perform the analysis via the CIR database 108, the collection module 104, and the authorization module 106, as described in FIGS. 1A-10.

The identity registration system 102 can assign each device 200 within the whitelist into one of a plurality of categories. The identity registration system 102 will assign the device identifier 208 having an authorization status 116 to the first category. If the device identifier 208 does not have an authorization status 116 because the device identifier 208 is not authentic, the identity registration system 102 will assign the device identifier 208 to the second category. If the device identifier 208 does not have an authorization status 116 because the device identifier 208 is duplicative, the identity registration system 102 will assign the device identifier 208 to the third category. The identity registration system 102 can lock each device 200 in the second category or the third category to the network 204 that the device identifier 208 is associated with or connected to, and blacklist the device identifier 208 from other networks. Each device 200 in the second category or the third category can be notified by the identity registration system 102 that they are restricted to the network 204 currently being used. After an observation period concludes, an enforcement period will begin during which the identity registration system 102 may assign the device identifier 208 to a list responsive to data collected during the observation period or enforcement period.

During the enforcement period, the identity registration system 102 or the local identification system 110 can assign device identifiers 208 to the whitelist, graylist or blacklist maintained on the CIR database 108 and the LIR database 108. The identity registration system 102 can assign device identifiers registering through the authorization module and the collection module in accordance with one or more policies similar to the policies used to assign device identifiers being registered during the observation period. In some embodiments, certain device identifiers can be assigned to the whitelist during the observation period but during the enforcement period, device identifiers with the same authentication status or collection status may be assigned to a graylist or blacklist. Similarly, during the enforcement period, the local identification system 110 can be configured to assign device identifiers of devices connecting to their respective network to either the whitelist, graylist or blacklist if the device identifier is not found in the LIR database 112 of the local identification system 110. Device identifiers assigned to either the whitelist, graylist or blacklist by the local identification system 110 can later be reassigned to a different list by the identity registration system 102 based on certain events. For example, a device identifier may be assigned to a graylist if taxes for the device have not been paid. After a certain period of time, the device identifier can be assigned to the blacklist if the taxes are still not paid past the predetermined time window. The device identifier can be assigned to the whitelist after the identity registration system 102 has determined that the taxes for the device have been paid.

During the enforcement period, the identity registration system 102 or a corresponding local identification system 110 analyzes each device identifier 208 and assigns them to a list. If the device identifier 208 does not have an authorization status 116, the identity registration system 102 or the corresponding local identification system 110 can assign the device identifier 208 to graylist or blacklist. In some embodiments, the identity registration system 102 or the corresponding local identification system 110 can assign the device identifier 208 without an authorization status 116 to the whitelist for a first device 200 and to the blacklist associated for all subsequent devices having the same device identifier 208. The identity registration system 102 or the corresponding local identification system 110 might not be able to assign a null or fake device identifier 208, so a secondary device identifier associated with the device identifier 208 will be assigned to a list. The identity registration system 102 can remove the graylist or blacklist assignment of the device identifier 208 responsive to the device identifier 208 receiving an authorization status 116.

The identity registration system 102 or the corresponding local identification system 110 can assign the device identifier 208 to the graylist responsive to the device 200 identifier being fake, not authentic, not having an authorization status 116, and not having a collection status 118. The identity registration system 102 or the corresponding local identification system 110 can assign the device identifier 208 to the whitelist responsive to the device identifier 208 having an authorization status 116, a collection status 118, and that the device 200 was not used on any network 204. The identity registration system 102 or the corresponding local identification system 110 can assign the device identifier 208 to the whitelist responsive to the device identifier 208 having an authorization status 116, a collection status 118, and history of usage on a network 204. The identity registration system 102 or the corresponding local identification system 110 can assign the device identifier 208 to the graylist responsive to the device identifier 208 having an authorization status 116, not having collection status 118, and having a request for a collection status 118. The identity registration system 102 or the corresponding local identification system 110 can assign the device identifier 208 to the graylist responsive to the device identifier 208 having an authorization status 116, no collection status 118, and that the device identifier 208 is active on a network 204. The identity registration system 102 or the corresponding local identification system 110 can assign the device identifier 208 to the graylist responsive to the device identifier 208 as not having an authorization status 116 because of an authentic but duplicative device identifier.

The identity registration system 102 or the corresponding local identification system 110 can analyze a device 200 connected to the network 204 and having a device status 220 of whitelist or graylist, and remove the authorization status 116 of the device identifier 208 responsive to determining that the device identifier 208 is duplicative. The identity registration system 102 or the corresponding local identification system 110 can then assign the device identifier 208 to the graylist or blacklist.

The identity registration system 102 or the corresponding local identification system 110 can analyze a device 200 connected to the network 204 and having a device status 220 indicating that the device identifier 208 is on the whitelist or graylist, and remove the authorization status 116 of the device identifier 208 responsive to determining that the device identifier 208 is fake. The identity registration system 102 or the corresponding local identification system 110 can assign the device identifier 208 to the graylist or blacklist.

The identity registration system 102 or the corresponding local identification system 110 can analyze a device 200 attempting to connect to the network 204, and responsive to that the device identifier 208 does not have an authorization status 116 because the device identifier 208 is fake, assign the device identifier 208 to the graylist or blacklist.

The identity registration system 102 can analyze a device identifier 208 that was assigned to the whitelist or graylist during the observation period. Responsive to determining that the device identifier 208 is duplicative, the identity registration system 102 can remove the authorization status 116 of the device identifier 208. The identity registration system 102 can then assign the device identifier 208 to the graylist.

In some implementations, during the enforcement period, the identity registration system 102 or the corresponding local identification system 110 can analyze a device 200 attempting to connect to the network 204 and determine that the device identifier 208 does not have an authorization status 116 because the device identifier 208 is duplicative. The identity registration system 102 or the corresponding local identification system 110 can subsequently assign the device identifier 208 to the graylist.

By analyzing the device identifier 208 at different times, the identity registration system 102 can change or assign the device identifier 208 based on a time based policy. For example, the identity registration system 102 can identify a first time corresponding to an event when the device is accessing the network 204 of the mobile network operator 115. The identity registration system 102 can then assign the device identifier 208 to the graylist responsive to the device identifier 208 having an authorization status 116 and not having a collection status 118 at a first time. The identity registration system 102 can then assign the device identifier 208 to the blacklist responsive to determining that a predetermined amount of time has elapsed since the first time.

The predetermined amount of time is based on a policy. The policy can be generated by an operator, authorization agency, authorizing entity, or payment agency, among others. In some embodiments, the policy can be generated by an entity that maintains the CIR database. In some embodiments, the policy can be generated by the ministry of finance, telecommunications or any other organization that is authorized by a government to establish the policy according to which devices are allowed to access the network. In some embodiments, the policy can be generated by a regulator, importer, or government agency. The identity registration system 102 can transmit data indicating an amount of time that the device 200 will be assigned to the graylist before the device identifier 208 is assigned to the blacklist unless the device identifier 208 of the device 200 obtains a collection status 118 or authorization status 116. As described above, the device identifier 208 of the device 200 can obtain the collection status 118 responsive to paying taxes or becoming compliant with authorizing entity regulations. The device identifier 208 of the device 200 can obtain the authorization status 116 responsive to receipt of payment at a retailer, network provider, or other entity assigned to collect payment. The identity registration system can transmit data indicating an amount of time the device 200 has to obtain the collection status 118 or the authorization status 116. In some implementations, the time the device 200 has to obtain the collection status 118 or the authorization status 116 can be 90 days. In some implementations, the time the device 200 has to obtain a collection status 118 can be 1 day, 2 days, 3 days, 4 days, 5 days, 6 days, 7 days, 10 days, 15 days, 20 days, 30 days, 45 days, 60 days, 75 days, 90 days, 120 days, 150 days, 180 days, or even 365 days or more.

However, it should be appreciated that this length of time can be set based on a policy and can vary from 1 hour to 1 year, or even more. The identity registration system 102 can determine a time indicating when a reminder will be sent to obtain the collection status 118 or the authorization status 116. In some implementations, the local identification system 110 can be configured to send the reminder 30 days, 7 days, or 1 day prior to the device 200 being assigned to the blacklist.

The identity registration system 102 can detect cloned or duplicative devices by analyzing secondary device identifiers. For instance, examples of secondary device identifiers can be phone numbers associated with the device, SIM card numbers, International mobile subscriber identity (IMSI) or a Mobile Station International Subscriber Directory Number (MSISDN), among others. Cloned devices are devices that have at least one device identifier, such as the IMEI number of the device, which matches another device's IMEI number. To detect a cloned device, the identity registration system 102 can determine that two devices having the same IMEI number are connected to one or more networks at the same time. In particular, the identity registration system 102 can determine that a second device identifier of a second device matches a first device identifier of a first device. Since two devices are associated with the same device identifier, the identity registration system 102 can compare secondary device identifiers of the two devices having the same device identifier. The identity registration system 102 can determine that a third device identifier of a different type of the second device does not match a corresponding device identifier of the first device. The identity registration system 102 can determine that a single IMEI number is associated with two separate devices with different secondary device identifiers indicating that one of the devices with the IMEI number is a cloned or duplicative device. The identity registration system 102 can then assign a label indicating that one of the two devices corresponds to a cloned or duplicative device. In some embodiments, the identity registration system 102 can assign a label indicating that the second device corresponds to a cloned or duplicative device responsive to determining that the second device is cloned.

If the identity registration system 102 determined that the device identifier 208 of the device is cloned, the identity registration system 102 can generate a notification to be transmitted to at least one of the two devices having the cloned device identifier 208 to get the device checked. The identity registration system 102 can then assign the device to a graylist or blacklist. In some embodiments, the device can be assigned to a graylist for a predetermined amount of time to give the device user an opportunity to get the device checked or verified. If the device is not checked or verified by the predetermined time, the identity registration system 102 can assign the device to the blacklist, thereby restricting the device from accessing the one or more networks 115.

Since data associated with the device identifier 208 can change, the identity registration system 102 can reanalyze the device identifier 208. The identity registration system 102 can reanalyze the device identifier 208 of the device 200 responsive to the device 200 connecting to any network 204, changing its mobile number, or changing its secondary identifier with the network 204. In some implementations, the identity registration system 102 can reanalyze the device identifier 208 every second, minute, hour, day, week, month, or at any other frequency.

The identity registration system 102 can transmit a notification 224, via the local identification system 110, to the device 200 based on the data associated with the device identifier 208. In some embodiments, the local identification system 110 can be configured to transmit the notification without receiving instructions from the identity registration system 102. The notification 224 can include the device status 220. The device 200 receives and displays the notification 224. The notification 224 can include the name of the device 200 and its device identifier 208, authorization status 116, collection status 118, and network usage history for each network 204. The notification 224 can include a request for the device 200 to verify the name of the device 200 and its device identifier 208. The device status 220 can include data about the time and the network 204 corresponding to the previous usage of the device 200. The notification 224 can include a request for the device 200 to obtain a collection status 118. In some implementations, the notification 224 can alert the device 200 that the device 200 is active on a plurality of networks, and thereby has a duplicative device identifier 208. The notification may include instructions requesting that this device obtain a different mobile number or be assigned to a blacklist for being duplicative. The notification 224 can include data about how the device 200 might be converted to a blacklist responsive to not having an authorization status 116 or a collection status 118. If the identity registration system 102 determined that the device identifier 208 of the device is cloned, the notification 224 can include instructions that the device 200 associated with the device identifier 208 needs to be investigated by a shop, network provider, or mobile network operator 115.

By implementing the device detection and registration system 100, the identity registration system 102 can be configured to generate and provide information relating to devices accessing the one or more networks of the mobile network operators 115. In some embodiments, the user interface 124 provided by the identity registration system 102 can receive view and get statistics about the devices in the country (e.g. percentage whitelisted), collection status 118, authorization status 116, authenticity, duplicate, financial reports, and pre-authorization and authorization reports. The user interface 124 can provide a list of whitelisted devices connected to a network 204, whitelisted devices not connected to a network, devices by authorization status 116, devices by duplicate status, devices by authenticity, swapped devices, devices previously seen by each network and their usage history. The user interface 124 can also provide a list of blacklisted devices, graylisted devices, or collection status 118 data, imported devices organized by date, importer, device type, or device model. The user interface 124 can also provide collection status 118 reports grouped by date, importer, device type, or device model. Devices with a collection status 118 can be grouped by collection status, importer, device type, or device model. Each device 200 with an authorization status 116 can be grouped by authenticity status, importer, device type, or device model. All reports shall include the device identifiers analyzed by the identity registration system 102, as well as time based reports of these device identifiers of when those devices were analyzed by the identity registration system 102.

The user interface 124 can provide a time based reports over a user customizable time period. The user interface 124 can create user accounts or user groups (e.g. group admin or customer support group) for the user interface 124 with different access rights and various privileges. Some user accounts can change the list that the device identifier is associated with, such as changing the list from blacklist to whitelist. Some user accounts can edit the device data, such as device identifier. The user interface 124 records all user activity into log files by user IP address, actions taken, and time.

Figure 3A:
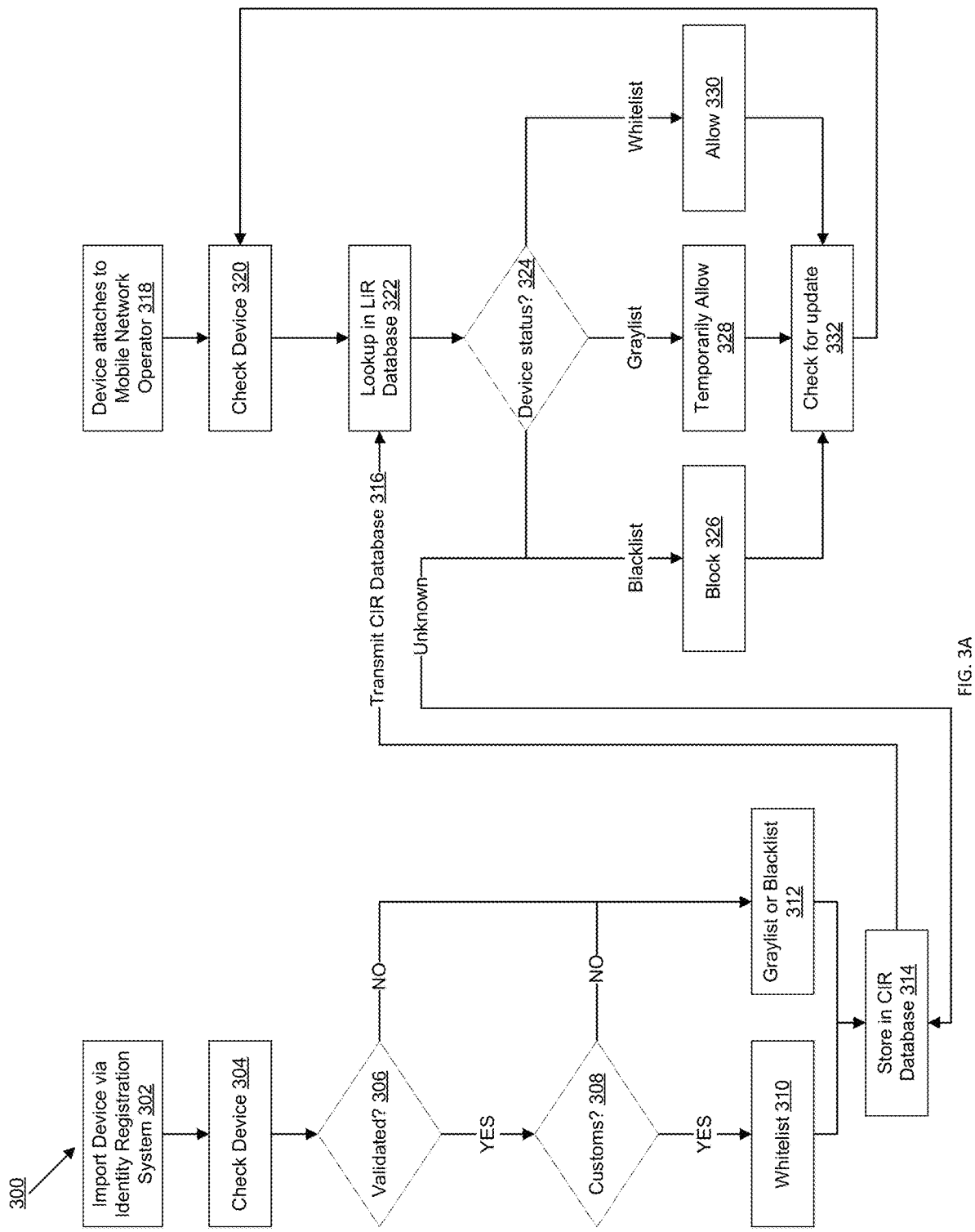
FIG. 3A illustrates a method for device detection and registration according to embodiments of the present disclosure.

B. Process and Workflow of an Implementation of the System for Device Detection and Registration FIG. 3A illustrates a method for device detection and registration according to embodiments of the present disclosure. The method can include at least two processes of detecting and registering the device 200. The first process, described in steps 302-316, includes detecting the device by the identity registration system 102. The second process, described in steps 318-330, describes detecting the device 200 by mobile network operator 115. With respect to the first process, the method 300 includes identifying a device 200 via the identity registration system 102 (step 302). The identity registration system 102 checks the device identifier 208 (step 304). The identity registration system 102 checks the device identifier 208 for an authorization status 116 (step 306). If the device identifier 208 has an authorization status 116, then the identity registration system 102 checks the device identifier 208 for a collection status 118 (step 308). If the device identifier 208 has a collection status 118, then the identity registration system 102 assigns the device identifier 208 to a whitelist (step 310). If the device identifier 208 does not have an authorization status 116 or if the device identifier 208 does not have a collection status 118, then the identity registration system 102 assigns the device identifier 208 to a graylist or blacklist (step 312). The CIR database 108 stores the whitelist, graylist, or blacklist assignment (step 314). The identity registration system 102 transmits the CIR database 108 to the LIR database 112 (step 316). With respect to the second process, the method 300 includes the device 200 attaching to the mobile network operator 115 (step 318). The local identification module 110 of the mobile network operator 115 checks the device identifier 208 (step 320). The identification system module 114 of the local identification module 110 looks up the device identifier 208 in the LIR database 112 (step 322). The identification system module 114 returns a device status 220 (step 324). If the device status 220 is blacklist, then the mobile network operator 115 prevents the device 200 associated with the device identifier 208 from connecting to the network 204 (step 326). If the device status 220 is graylist, then the mobile network operator 115 temporarily allows the device identifier 208 to connect (step 328). If the device status 220 is whitelist, then the mobile network operator 115 allows the device identifier 208 to connect to the network 204 (step 330). If the device status 220 is unknown, then the identity registration system 102 reanalyzes the device identifier 208 (step 304). If the device status 220 of the device identifier 208 indicates that the device identifier is on the whitelist, graylist, or blacklist, then the mobile network operator 115 rechecks the device identifier 208 for updates (step 332).

The device 200 can be detected via the identity registration system 102 (step 302). The collection module 104 can first discover the device 200. For example, the collection module 104 can receive a list of device identifiers from a client device of an importer or retailer or other entity trying to register device identifiers of imported devices. In some embodiments, a user may access a portal or user interface of the identity registration system 102 to register their device.

The identity registration system 102 checks the device identifier 208 (step 304). The identity registration system 102 can check a subscriber identification module (SIM) card number, an international mobile equipment identity number (IMEI), or a Mobile Station International Subscriber Directory Number (MSISDN). Different versions of the IMEI can be supported, such as 14, 15, and 16 digit IMEIs. The identity registration system 102 can check the device identifier for a collection status 118, an authorization status 116, and whether the device identifier is fake or duplicative. The identity registration system can check the CIR database to see if the device identifier already exists in the CIR database. A device identifier can exist in the CIR database if the identity registration system 102 previously added the device identifier to the CIR database responsive to the device identifier being registered (or attempted to register) with the identity registration system. Alternatively, the device identifier can exist in the CIR database if the identity registration system 102 previously added the device identifier to the CIR database responsive to a device having the device identifier connecting to one or more networks of mobile network operators in communication with the identity registration system 102.

The identity registration system 102 checks the device identifier 208 for an authorization status 116 (step 306). The authorization module 106 can determine that the device identifier 208 is authentic and not fake. An authentic device identifier is readable by a mobile network operator, generated by a legitimate manufacturer or regulatory entity, and capable of being processed by the mobile network operator. The authorization module 106 can determine that the device identifier 208 is unique and non-duplicative. The authorization module 106 can then transmit authorization status 116 to the collection module 104. The authorization module 106 can determine that the device identifier is unique and non-duplicative if the device identifier does not exist in the CIR database. The authorization status can be understood to mean that the device has a device identifier that matched a device identifier included in a standards database, such as one maintained by the GSM standards organization and that the device identifier doesn't already exist in the CIR database in association with another device.

If the device identifier 208 has an authorization status 116, the identity registration system 102 can also check to determine if the device identifier 208 has a collection status 118 (step 308). The collection status can indicate that taxes and duties for the device have been paid. For each device brought into a jurisdiction, the collection module 104 can process or collect the payments of taxes and duties, either by importation or for personal use. The jurisdiction can be a region, country, or predetermined area. The collection module 104 can receive data for a device such as its device identifier. The collection module 104 can receive a single device or a batch of devices. The collection module 104 can receive importer data such as their authorizing entity identity number, name, company name, date, device model, and device identifier. In some implementations, the collection module 104 can transmit the device identifier, relevant amount of taxes and duties paid, and the transaction reference numbers to the authorization module 106.

The identity registration system 102 can assign the device identifier 208 to a whitelist (step 310) responsive to determining that the device has been authorized and taxes and duties have been paid. Devices having device identifiers included in the whitelist are authorized to permanently access the one or more networks unless the device is later determined to be a duplicate, fake or otherwise non-compliant.

The identity registration system 102 assigns the device identifier 208 to a graylist or blacklist (step 312) responsive to determining that the device is either not authorized or taxes and duties have not been paid. The identity registration system 102 can use one or more policies to determine whether the device is to be assigned to a graylist or a blacklist. The policies can be set by a government entity, one or more mobile network operators, or other entities. Devices having device identifiers assigned to the graylist can be temporarily allowed to access the one or more networks. Devices having device identifiers assigned to the blacklist are restricted from accessing the one or more networks. Device identifiers assigned to the graylist can be assigned to a blacklist and vice versa after a period of time that can be defined by the one or more policies.

Still referring to FIG. 3A, the identity registration system 102 can store the device identifiers and an indication of the list (whitelist, graylist, or blacklist) to which the device identifier is assigned to the CIR database 108 (step 314). The CIR database 108 can store that the device identifier 208 is assigned to the whitelist, graylist, or blacklist.

The identity registration system 102 can transmit data included in the CIR database 108 to the LIR database 112 (step 316). The LIR database 112 and the CIR database 108 can communicate via LIR database-CIR database queries 122a-122n (generally referred to as LIR database-CIR database query 122). The CIR database 108 can maintain separate lists for device identifiers that are classified in a whitelist, graylist, or blacklist. LIR database 112 can receive the lists from the CIR database 108. The data transmitted from the CIR database can be stored in the LIR database (step 322) such that the LIR database can either replicate the CIR database or include a portion of data of the CIR database. As a result of this architecture, devices connecting to networks of the MNO can be capable of being authorized for accessing the network of the MNO by relying on the data stored in the respective LIR, resulting in fewer requests being transmitted to the CIR database from each of the local identification systems of the MNOs.

Still referring to FIG. 3A, in the event that a device connects to a network of a mobile network operator 115, the flow can start at step 318. The device connects to a network of the mobile network operator 115 (step 318). For example, a device undeclared with the collection module 104 of the identity registration system 102 can connect to the network of the mobile network operator 115. The identification system module 114 of the local identification system 110 can receive the device identifier. In some embodiments, the identification system module 114 of the local identification system 110 can receive the device identifier in a check IMEI function request or a device check 210 request.

The local identification system 110 of the mobile network operator 115 checks the device identifier 208 (step 320) responsive to receiving the device identifier of the device connecting to the network. In some embodiments, the identification system module 114 can forward the request to the identity registration system 102 to lookup the device identifier of the device attempting to connect to the local identification system 110. The identification system module 114 can look up the device identifier in the LIR database 112. The LIR database 112 can respond to the identification system module 114 with the list that each device identifier is on. Each device identifier can be on the whitelist, the graylist, the blacklist, or the unknown list.

The local identification system 110 returns a device status 220 (step 324). As described with respect to FIGS. 2A-2B, the local identification system 110 can compare the equipment identity register response 214 to the database response 218. If the equipment identity register response 214 and the database response 218 are identical, then the local identification system 110 can transmit the device status 220 to the network 204. If there is a discrepancy between the equipment identity register response 214 and the database response 218, the local identification system 110 can use a priority policy to choose the device status 220. As described with respect to FIG. 2C, the identification system module 114 can determine a device status 220 based on the database response 218. If the database response 218 indicates that the device identifier is on the unknown list, then the identity registration system looks up the device identifier in the CIR database 108 as outlined in steps 304-314.

If the device status 220 of the device identifier 208 associated with the device 200 is blacklist, then the mobile network operator 115 of the network 204 prevents the device 200 associated with the device identifier 208 from access the network (step 326). If the device status 220 is graylist, then the mobile network operator 115 of the network 204 can allow the device 200 associated with the device identifier 208 to temporarily access the network 204 (step 328). If the device status 220 is whitelist, then the mobile network operator 115 of the network 204 can allow the device 200 associated with the device identifier 208 to connect to the network 204 (step 330).

If the device status 220 of the device identifier 208 is whitelist, graylist, or blacklist, the identification system module 114 of the mobile network operator 115 periodically reanalyzes the device identifier 208 based on changes that may occur in the CIR database or the LIR database (step 332). Based on the updated information, the identity registration system 102 may change the list that the device identifier 208 is assigned to. The update may occur at a predetermined time, or at predetermined intervals, such as hourly or daily. In some implementations, the update can occur in real-time. The update can occur via the CIR database—LIR database query 122. In some implementations, the identity registration system 102 can reanalyze the device identifier 208 of the device 200 responsive to the device 200 connecting to any network 204, changing its mobile number, or changing its identifier with the network 204.

Figure 3B:
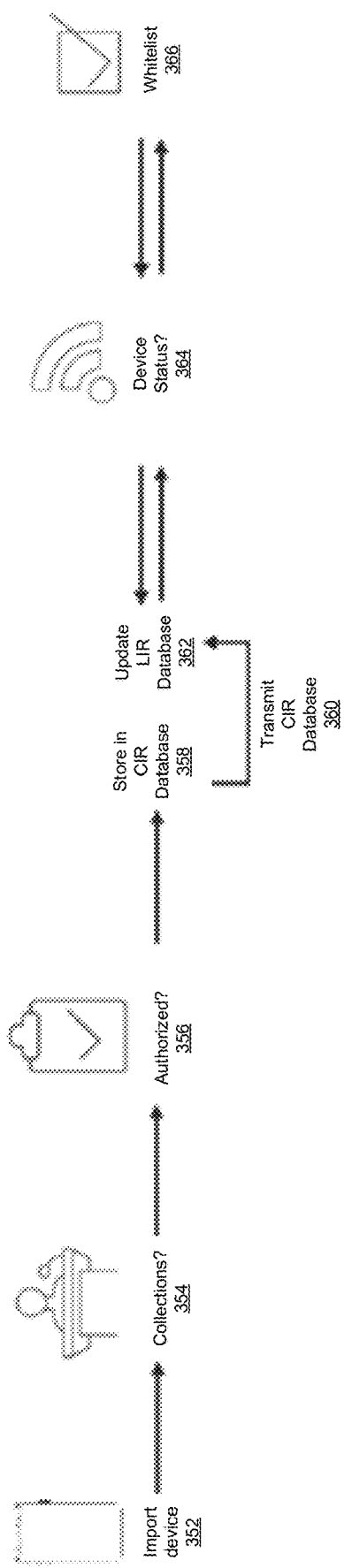
FIG. 3B illustrates a flow for device detection and registration according to embodiments of the present disclosure.

Now referring to FIG. 3B, illustrated is a flow for device detection and registration according to embodiments of the present disclosure. A device 200 is imported in flow 352, as similarly described in step 302. Next, the identity registration system 102 determines a collection status 118 of a device identifier 200 of the device 200 in flow 354, as similarly described in steps 304 and 308. Next, the identity registration system 102 determines an authorization status 116 for the device identifier 208 of the device 200 in flow 356, as similarly described in step 306. In the exemplary flow 354 and 356, the device identifier 208 receives both the collection status 118 and the authorization status 116, so the identity registration system 102 assigns the device identifier 208 to the whitelist, as similarly described in step 310. In flow 358, the CIR database 108 stores the collection status 118, the authorization status 116, and the assignment of the device identifier 208, as similarly described in step 314. In flow 360, the CIR database 108 transmits the assignment of the device identifier 208 to the LIR database 112, as similarly described in step 316. The LIR Database 112 stores the assignment of the device identifier 208 of the device 200 in flow 362, as similarly described in step 322. In the exemplary flow 364, responsive to the identification system module 114 submitting a database query 216 to lookup the device identifier 208 in the LIR database 112 and thereafter determining a database response 218 indicating that the device identifier 208 is on the whitelist, the identification system module 114 can determine the device status 220 for the device identifier 208 as whitelist, as similarly described in step 324. Finally, responsive to determining the device status 220 indicating that the device identifier 208 is on the whitelist, the device can receive services from the network in flow 366, as similarly described in step 330. Thereafter, device status 220 of the device identifier 208 can be reanalyzed in flow 362 or reassigned in flow 364, as similarly described in step 332.

Figure 4:
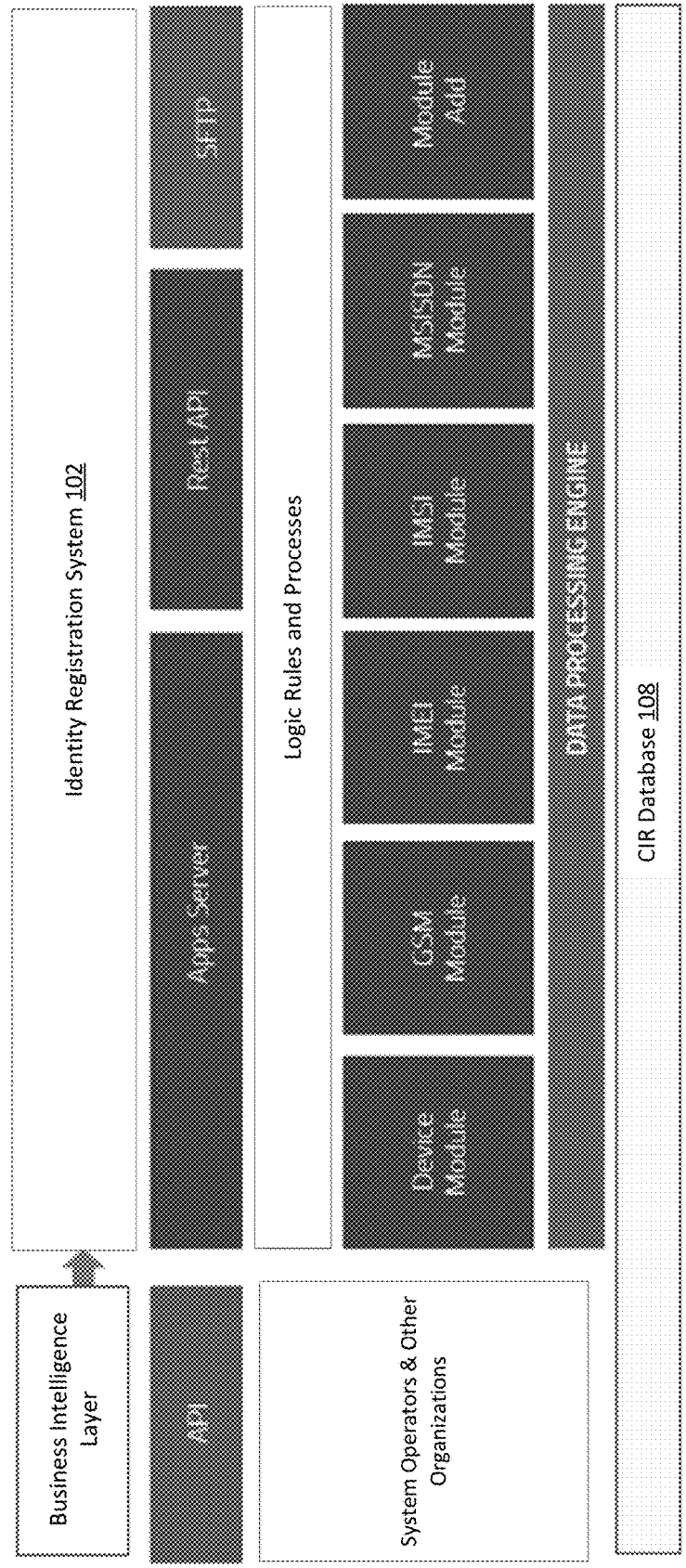
FIG. 4 illustrates an implementation stack for the identity registration system.

Now referring to FIG. 4, the identity registration system 102 can represent the depicted implementation stack. The identity registration system 102 can include the business intelligence layer. A user, regulator, or controlling entity may connect to the identity registration system 102 via the business intelligence layer. The API layer can include the apps server, the rest API, and the SFTP. The API layer can provide a web portal through which user can communicate with identity registration system 102. The portal can communicate with identity registration system 102 via one or more APIs, shown in one or more layers. The apps server can include the user interface 124. The rest API can facilitate communication between the identity registration system 102 and the local identification system 110, and the modules described herein. The SFTP, also known as the SSH File Transfer Protocol can establish a secure connection between the modules described herein. The system operators & other organizations layer can be the entity that can manage the CIR database 108. One or more different entities can access the identity registration system 102 such as government, ministries, retailer, or importer. The identity registration system 102 can include the logic rules and processes layer. The logic rules and processes layer can manage the device identifiers 208 and decide whether they are assigned a whitelist, blacklist, graylist, or unknown list. The identity registration system 102 can include modules that are designed to extract information from the components interacting with the devices identity registration system 102. The device module can extra information about the device 200 such as make and model. The GSM module can facilitate the connection to the devices via the global system for mobile communications. The IMEI module can extra the IMEI data from a device 200 for the device identifier 208. The IMSI module can extra the IMSI data from the device 200 for a device identifier 208 or a secondary device identifier. The MSISDN module can extract the MSISDN data from the device 200 for a device identifier 208, a secondary device identifier, or a third device identifier. The module add can import information about a device 200 such as another device identifier or specification information. The data processing engine can facilitate enterprise data management, such as by taking data processing pipelines, abstract business logic, and process the data on frameworks in an optimized way, in a streaming or a batch mode, on-premises or in the cloud. The CIR Database 108 can store and log all the activities performed in the implementation stack.

Figure 5A:
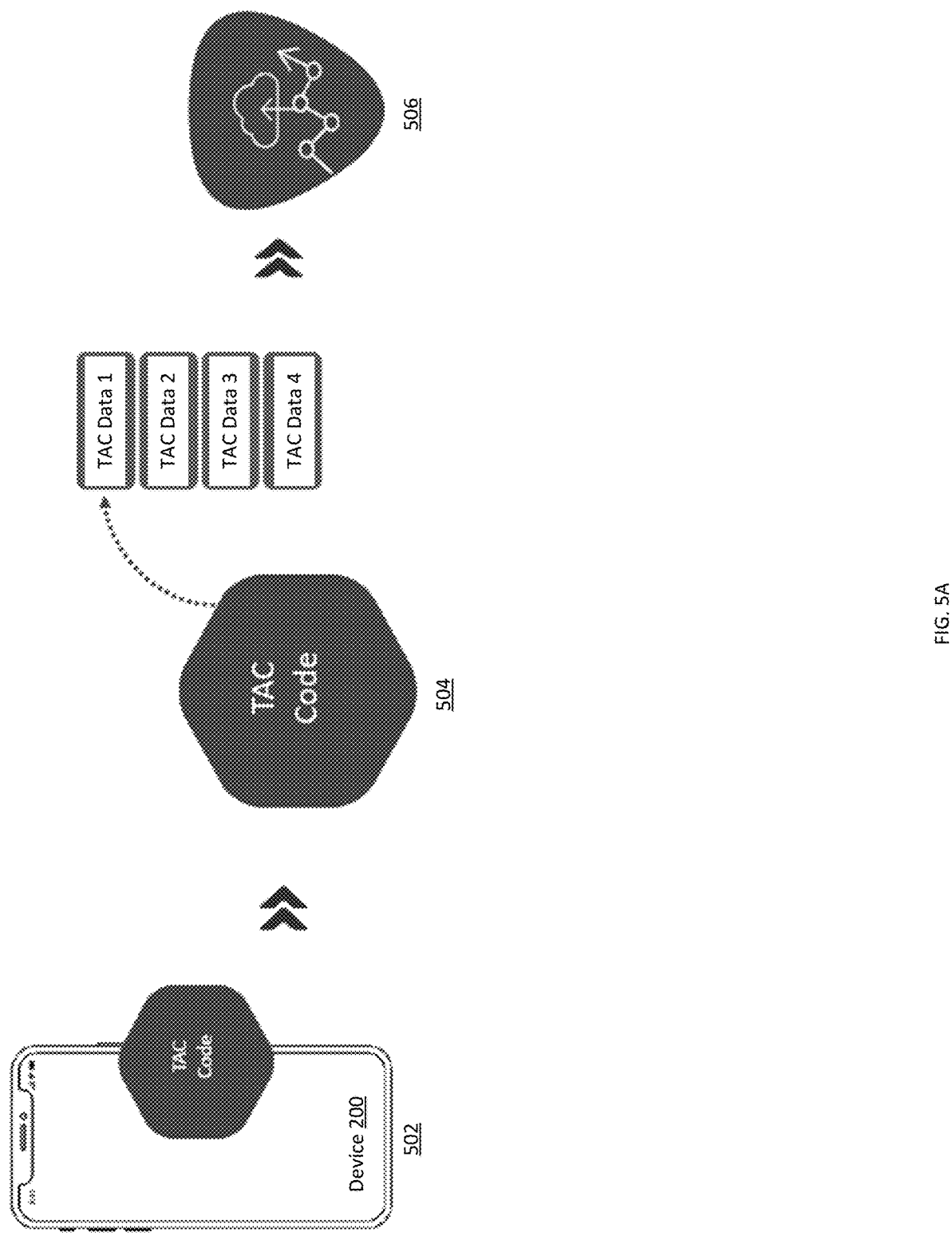
FIG. 5A illustrates a type allocation code of the device analyzed by the device detection and registration system.

Now referring to FIG. 5A, illustrated is a flow for a Type Allocation Code (TAC) of the device analyzed by the device detection and registration system 100. A device 200 can include a TAC. The TAC is the initial eight-digit portion of the 15-digit IMEI and 16-digit IMEISV codes used to uniquely identify wireless devices. In 502, the device 200 map maps detailed device data based on the TAC. In 504, illustrated is the data obtained from the TAC. The TAC code can be imported by the identity registration system 102. The TAC code can be analyzed by an MIRS BI analytics tool. The Type Allocation Code identifies a particular model (and often revision) of wireless telephone for use on a GSM, UMTS or other IMEI-employing wireless network. The first two digits of the TAC are the Reporting Body Identifier. This indicates the GSMA-approved group that allocated the TAC. Both the old and new TAC uniquely identify a model of phone, although some models may have more than one code, depending on revision, manufacturing location, and other factors. In 506, the identity registration system 102 obtains the TAC from the device and analyzes it. The identity registration system 102 can analyze over 100 data points associated with the TAC.

Figure 5B:
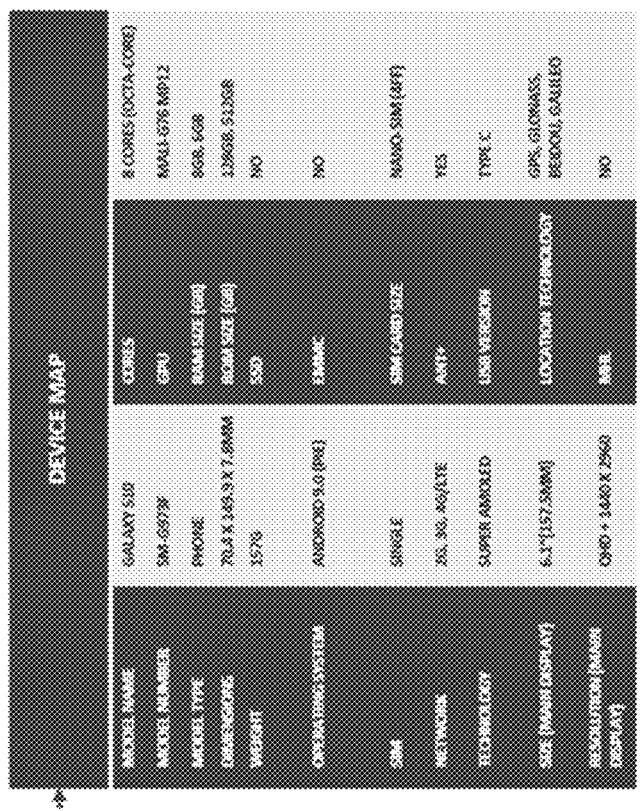
FIG. 5B illustrates data extracted from the type allocation code of the device for analysis by the device detection and registration system.
Figure 5B:
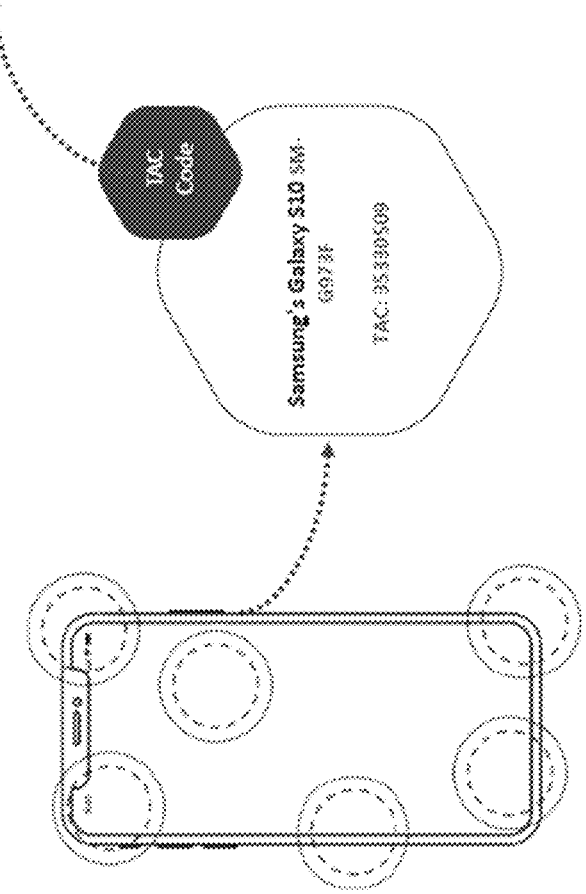

Now referring to FIG. 5B, illustrated is the data extracted from the TAC of the device 200 for analysis by the device detection and registration system 100. The device map illustrates the information obtained from the device 200. The device map can include specifications and data associated with the device 200 such as model name, model number, model type, dimensions, weight, operating system, SIM, network, technology, size of a main display, resolution of a main display, central processing unit (CPU) cores, graphical processing unit (GPU) cores, random access memory (RAM) size, read only memory size, solid state device (SSD), embedded Multi-Media Controller (eMMC), Subscriber Identity Module (SIM) card size, adaptive network topology plus (ANT+), universal serial bus (USB) version, location technology, and Mobile High-Definition Link (MHL).

C. Computer System

Figure 6:
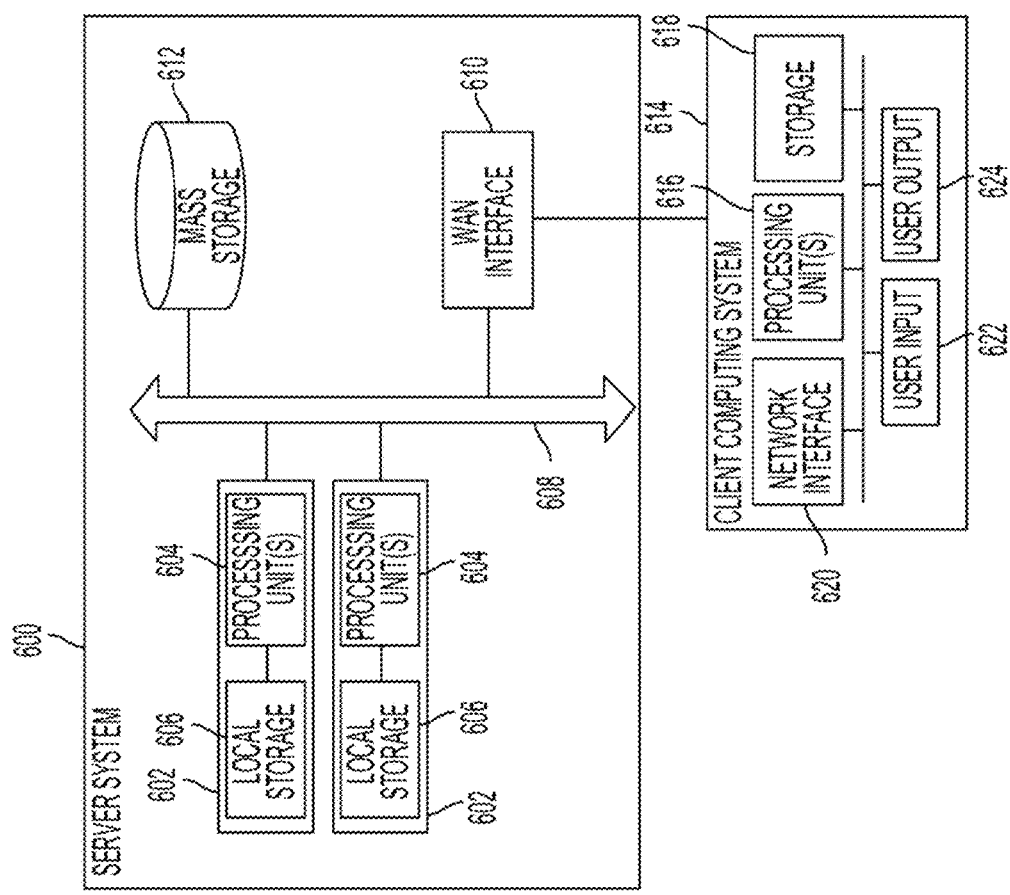
FIG. 6 illustrates a simplified block diagram of a representative server system 600 and client computer system 614 usable to implement certain embodiments of the present disclosure.

Various operations described herein can be implemented on computer systems, which can be of generally conventional design. FIG. 6 shows a simplified block diagram of a representative server system 600 and client computer system 614 usable to implement certain embodiments of the present disclosure. In various embodiments, server system 600 or similar systems can implement services or servers described herein or portions thereof. Client computer system 614 or similar systems can implement clients described herein. The device detection and registration system 100 and others described herein can be similar to the server system 600.

Server system 600 can have a modular design that incorporates a number of modules 602 (e.g., blades in a blade server embodiment); while two modules 602 are shown, any number can be provided. Each module 602 can include one or more processors 604 and local storage 606.

One or more processors 604 can include a single processor, which can have one or more cores, or multiple processors. In some embodiments, one or more processors 604 can include a general-purpose primary processor as well as one or more special-purpose co-processors such as graphics processors, digital signal processors, or the like. In some embodiments, some or all processing units 604 can be implemented using customized circuits, such as application specific integrated circuits (ASICs) or field programmable gate arrays (FPGAs). In some embodiments, such integrated circuits execute instructions that are stored on the circuit itself. In other embodiments, one or more processors 604 can execute instructions stored in local storage 606. Any type of processors in any combination can be included in one or more processors 604.

Local storage 606 can include volatile storage media (e.g., conventional DRAM, SRAM, SDRAM, or the like) and/or non-volatile storage media (e.g., magnetic or optical disk, flash memory, or the like). Storage media incorporated in local storage 606 can be fixed, removable or upgradeable as desired. Local storage 606 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that one or more processors 604 need at runtime. The ROM can store static data and instructions that are needed by one or more processors 604. The permanent storage device can be a non-volatile read-and-write memory device that can store instructions and data even when module 602 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 606 can store one or more software programs to be executed by one or more processors 604, such as an operating system and/or programs implementing various server functions such as functions of the device detection and registration system 100 of FIG. 1A or any other system described herein, or any other servers or system associated with the device detection and registration system 100 of FIG. 1A.

"Software" refers generally to sequences of instructions that, when executed by one or more processors 604 cause server system 600 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by one or more processors 604. Software can be implemented as a single program or a collection of separate programs or program modules that interact as desired. From local storage 606 (or non-local storage described below), one or more processors 604 can retrieve program instructions to execute and data to process in order to execute various operations described above.

In some server systems 600, multiple modules 602 can be interconnected via a bus or other interconnect 608, forming a local area network that supports communication between modules 602 and other components of server system 600. Interconnect 608 can be implemented using various technologies including server racks, hubs, routers, etc.

A wide area network (WAN) interface 610 can provide data communication capability between the local area network (interconnect 608) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 606 is intended to provide working memory for one or more processors 604, providing fast access to programs and/or data to be processed while reducing traffic on interconnect 608. Storage for larger quantities of data can be provided on the local area network by one or more mass storage subsystems 612 that can be connected to interconnect 608. Mass storage subsystem 612 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 612. In some embodiments, additional data storage resources may be accessible via WAN interface 610 (potentially with increased latency).

Server system 600 can operate in response to requests received via WAN interface 610. For example, one of modules 602 can implement a supervisory function and assign discrete tasks to other modules 602 in response to received requests. Conventional work allocation techniques can be used. As requests are processed, results can be returned to the requester via WAN interface 610. Such operation can generally be automated. Further, in some embodiments, WAN interface 610 can connect multiple server systems 600 to each other, providing scalable systems capable of managing high volumes of activity. Conventional or other techniques for managing server systems and server farms (collections of server systems that cooperate) can be used, including dynamic resource allocation and reallocation.

Server system 600 can interact with various user-owned or user-operated devices via a wide-area network such as the Internet. An example of a user-operated device is shown in FIG. 11 as client computing system 614. Client computing system 614 can be implemented, for example, as a consumer device such as a smartphone, other mobile phone, tablet computer, wearable computing device (e.g., smart watch, eyeglasses), desktop computer, laptop computer, and so on.

For example, client computing system 614 can communicate via WAN interface 610. Client computing system 614 can include conventional computer components such as one or more processors 616, storage device 618, network interface 620, user input device 622, and user output device 624. Client computing system 614 can be a computing device implemented in a variety of form factors, such as a desktop computer, laptop computer, tablet computer, smartphone, other mobile computing device, wearable computing device, or the like.

Processor 616 and storage device 618 can be similar to one or more processors 604 and local storage 606 described above. Suitable devices can be selected based on the demands to be placed on client computing system 614; for example, client computing system 614 can be implemented as a "thin" client with limited processing capability or as a high-powered computing device. Client computing system 614 can be provisioned with program code executable by one or more processors 616 to enable various interactions with server system 600 of a message management service such as accessing messages, performing actions on messages, and other interactions described above. Some client computing systems 614 can also interact with a messaging service independently of the message management service.

Network interface 620 can provide a connection to a wide area network (e.g., the Internet) to which WAN interface 610 of server system 600 is also connected. In various embodiments, network interface 620 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 622 can include any device (or devices) via which a user can provide signals to client computing system 614; client computing system 614 can interpret the signals as indicative of particular user requests or data. In various embodiments, user input device 622 can include any or all of a keyboard, touch pad, touch screen, mouse or other pointing device, scroll wheel, click wheel, dial, button, switch, keypad, microphone, and so on.

User output device 624 can include any device via which client computing system 614 can provide data to a user. For example, user output device 624 can include a display to display images generated by or delivered to client computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 624 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the one or more processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, one or more processors 604 and 616 can provide various functionality for server system 600 and client computing system 614, including any of the functionality described herein as being performed by a server or client, or other functionality associated with message management services.

It will be appreciated that server system 600 and client computing system 614 are illustrative and that variations and modifications are possible. Computer systems used in connection with embodiments of the present disclosure can have other capabilities not specifically described here. Further, while server system 600 and client computing system 614 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method comprising:
receiving, by one or more processors, from a client associated with a first entity, a device identifier of a first device;
transmitting, by the one or more processors, to the first entity, an instruction indicating that the device identifier of the first device is authorized responsive to performing a lookup in a first set of databases using the device identifier;
receiving, by the one or more processors, from the first entity, a record of an event corresponding to the device identifier, the record including the device identifier, a first value associated with the device identifier, and a first event identifier identifying the event;
storing, by the one or more processors, in the first set of databases, a first entry identifying the device identifier, the first value, the first event identifier, a specification of the first device, and a first status indicating that the first device is authorized, the first set of databases including a plurality of second device identifiers corresponding to a plurality of second devices, each second device identifier of the plurality of second device identifiers assigned to a respective group of a plurality of groups;
assigning, by the one or more processors, the device identifier of the first device to a first group of the plurality of groups, each device identifier of the first group permanently allowed to access one or more networks via one or more mobile network operators; and
providing, by the one or more processors, to a first system maintaining a second set of databases for a first mobile network operator, data corresponding to the first entry identifying the device identifier, the first value, the first event identifier, the specification of the first device, and the first status, the second set of databases used by the first mobile network operator to respond to requests to check one or more device identifiers corresponding to respective one or more devices connecting to a first network of the first mobile network operator.

2. The method of claim 1, further comprising:
receiving, by the one or more processors, from the first system, data corresponding to a second device identifier of a second device, the second device identifier not included in the first set of databases, the data corresponding to the second device identifier stored in the second set of databases;
updating, by the one or more processors, the first set of databases to include a second entry including the data corresponding to the second device identifier of the second device;
assigning, by the one or more processors, the second entry corresponding to the second device identifier, a second status different from the first status; and
assigning, by the one or more processors, the second device identifier to one of a second group of the plurality of groups or a third group of the plurality of groups, each device identifier included in the second group temporarily allowed to access the one or more networks via the one or more mobile network operators and each device identifier included in the third group restricted from accessing the one or more networks via the one or more mobile network operators.

3. The method of claim 2, further comprising:
providing, by the one or more processors, to a second system maintaining a third set of databases for a second mobile network operator, data corresponding to the second entry, the third set of databases used by the second mobile network operator to respond to requests to check one or more device identifiers corresponding to respective one or more devices connecting to a second network of the second mobile network operator.

4. The method of claim 2, further comprising:
identifying, by the one or more processors, a first time corresponding to a second event when the second device is accessing the first network of the first mobile network operator;
updating, by the one or more processors, responsive to determining that a predetermined amount of time has elapsed since the first time, the second status of the second entry corresponding to the second device identifier to a third status different from the second status and the first status; and
assigning, by the one or more processors, the second device identifier to the third group of the plurality of groups.

5. The method of claim 4, wherein the predetermined amount of time is based on a policy, the policy generated by a second entity of the one or more processors.

6. The method of claim 1, wherein the device identifier included in the first entry is a first device identifier of the first device and further comprising:
determining, by the one or more processors, that the first device connected to the first network of the first mobile network operator at a first time;
receiving, by the one or more processors, from the first system, data corresponding to a second device identifier of a second device, the data corresponding to the second device identifier stored in the second set of databases, the second device connected to the second network of the second mobile network operator at the first time;
determining, by the one or more processors, that the second device identifier of the second device matches the first device identifier included in the first entry;
determining that a third device identifier of the second device does not match a corresponding device identifier of the first device included in the first entry; and
assigning, by the one or more processors, responsive to determining that the third device identifier of the second device does not match the corresponding device identifier included in the first entry, a label to a second entry indicating that the second device corresponds to a cloned device.

7. The method of claim 6, further comprising assigning, by the one or more processors, responsive to determining that the third device identifier of the second device does not match the corresponding device identifier of the first device included in the first entry, the second device identifier of the second device to one of a second group of the plurality of groups or a third group of the plurality of groups, each device identifier included in the second group temporarily allowed to access the one or more networks via the one or more mobile network operators and each device identifier included in the third group restricted from accessing the one or more networks via the one or more mobile network operators.

8. The method of claim 1, wherein providing, to the first system, the data corresponding to the first entry comprises providing, by the one or more processors, to the first system, the data corresponding to the first entry based on a time based update policy.

9. The method of claim 1, further comprising providing, by the one or more processors, to a plurality of second systems, the data corresponding to the first entry such that the first system and each second system of the plurality of second systems include the first entry.

10. The method of claim 1, wherein the device identifier is at least one of an International Mobile Station Equipment Identity (IMEI), International mobile subscriber identity (IMSI), or a Mobile Station International Subscriber Directory Number (MSISDN).

11. The method of claim 1, further comprising:
receiving, by the one or more processors, data corresponding to a second device identifier of a second device, the second device identifier included in the first set of databases and assigned a second status different from the first status;
determining, by the one or more processors, from the received data corresponding to the second device identifier, a second value and a second event identifier identifying a second event;
updating, by the one or more processors, responsive to determining that the second value and the second event identifier satisfies a status update policy, the second status of the second device identifier to the first status; and
assigning, by the one or more processors, responsive to updating the second status to the first status, the second device identifier to the first group of the plurality of groups and removing the second device identifier from a second group of the plurality of groups.

12. The method of claim 1, further comprising:
receiving, by the one or more processors, data corresponding to a third device identifier of a third device;
determining, by the one or more processors, that the third device identifier corresponds to an unauthorized device;
responsive to determining that the third device identifier corresponds to the unauthorized device, storing, by the one or more processors, in the first set of databases, a second entry identifying the third device identifier and a second status indicating that the third device is unauthorized; and
assigning, by the one or more processors, the third device identifier to one of a second group of the plurality of groups or a third group of the plurality of groups, each device identifier included in the second group temporarily allowed to access the one or more networks via the one or more mobile network operators and each device identifier included in the third group restricted from accessing the one or more networks via the one or more mobile network operators.

13. The method of claim 1, further comprising:
receiving, by the one or more processors, data corresponding to a third device identifier of a third device;
determining, by the one or more processors, that the third device identifier corresponds to at least one of a i) duplicate device identifier, ii) a fake device identifier, iii) a fake declaration of specifications or duties due for the third device, or iv) an indication that a transaction event identifying the third device has not been processed;
responsive to determining that the third device identifier corresponds to at least one of i) the duplicate device identifier, ii) the fake device identifier, iii) the fake declaration of specifications of the third device, or iv) the indication that the transaction event identifying the third device has not been processed, storing, by the one or more processors, in the first set of databases, a second entry identifying the third device identifier and a second status indicating that the third device is unauthorized; and
assigning, by the one or more processors, the third device identifier to one of a second group of the plurality of groups or a third group of the plurality of groups, each device identifier included in the second group temporarily allowed to access the one or more networks via the one or more mobile network operators and each device identifier included in the third group restricted from accessing the one or more networks via the one or more mobile network operators.

14. A system comprising:
one or more processors configured by machine-readable instructions to:
receive, from a client associated with a first entity, a device identifier of a first device;
transmit, to the first entity, an instruction indicating that the device identifier of the first device is authorized responsive to performing a lookup in a first set of databases using the device identifier;
receive, from the first entity, a record of an event corresponding to the device identifier, the record including the device identifier, a first value associated with the device identifier, and a first event identifier identifying the event;
store, in the first set of databases, a first entry identifying the device identifier, the first value, the first event identifier, a specification of the first device, and a first status indicating that the first device is authorized, the first set of databases including a plurality of second device identifiers corresponding to a plurality of second devices, each second device identifier of the plurality of second device identifiers assigned to a respective group of a plurality of groups;
assign the device identifier of the first device to a first group of the plurality of groups, each device identifier of the first group permanently allowed to access one or more networks via one or more mobile network operators; and
provide, to a first system maintaining a second set of databases for a first mobile network operator, data corresponding to the first entry identifying the device identifier, the first value, the first event identifier, the specification of the first device and the first status, the second set of databases used by the first mobile network operator to respond to requests to check one or more device identifiers corresponding to respective one or more devices connecting to a first network of the first mobile network operator.

15. The system of claim 14, wherein the one or more processors are further configured to:
receive, from the first system, data corresponding to a second device identifier of a second device, the second device identifier not included in the first set of databases, the data corresponding to the second device identifier stored in the second set of databases;
update the first set of databases to include a second entry including the data corresponding to the second device identifier of the second device;
assign the second entry corresponding to the second device identifier, a second status different from the first status; and
assign the second device identifier to one of a second group of the plurality of groups or a third group of the plurality of groups, each device identifier included in the second group temporarily allowed to access the one or more networks via the one or more mobile network operators, and each device identifier included in the third group restricted from accessing the one or more networks via the one or more mobile network operators.

16. The system of claim 14, wherein the one or more processors are further configured to:
provide, to a second system maintaining a third set of databases for a second mobile network operator, data corresponding to the second entry, the third set of databases used by the second mobile network operator to respond to requests to check one or more device identifiers corresponding to respective one or more devices connecting to a second network of the second mobile network operator.

17. The system of claim 15, wherein the one or more processors are further configured to:
identify a first time corresponding to a second event when the second device is accessing the first network of the first mobile network operator;
update, responsive to determining that a predetermined amount of time has elapsed since the first time, the second status of the second entry corresponding to the second device identifier to a third status different from the second status and the first status; and
assign the second device identifier to the third group of the plurality of groups.

18. The system of claim 17, wherein the predetermined amount of time is based on a policy, the policy generated by a second entity of the one or more processors.

19. The system of claim 14, wherein the device identifier included in the first entry is a first device identifier of the first device and wherein the one or more processors are further configured to:
determine that the first device connected to the first network of the first mobile network operator at a first time;
receive, from the first system, data corresponding to a second device identifier of a second device, the data corresponding to the second device identifier stored in the second set of databases, the second device connected to the second network of the second mobile network operator at the first time;
determine that the second device identifier of the second device matches the first device identifier included in the first entry;
determine that a third device identifier of the second device does not match a corresponding device identifier of the first device included in the first entry; and
assign, responsive to determining that the third device identifier of the second device does not match the corresponding device identifier included in the first entry, a label to a second entry indicating that the second device corresponds to a cloned device.

20. A non-transitory computer-readable storage medium having instructions embodied thereon, the instructions being executable by one or more processors to:
receive, from a client associated with a first entity, a device identifier of a first device;
transmit, to the first entity, an instruction indicating that the device identifier of the first device is authorized responsive to performing a lookup in a first set of databases using the device identifier;
receive, from the first entity, a record of an event corresponding to the device identifier, the record including the device identifier, a first value associated with the device identifier, and a first event identifier identifying the event;
store, in the first set of databases, a first entry identifying the device identifier, the first value, the first event identifier, a specification of the first device, and a first status indicating that the first device is authorized, the first set of databases including a plurality of second device identifiers corresponding to a plurality of second devices, each second device identifier of the plurality of second device identifiers assigned to a respective group of a plurality of groups;
assign the device identifier of the first device to a first group of the plurality of groups, each device identifier of the first group permanently allowed to access one or more networks via one or more mobile network operators; and
provide, to a first system maintaining a second set of databases for a first mobile network operator, data corresponding to the first entry identifying the device identifier, the first value, the first event identifier, the specification of the first device, and the first status, the second set of databases used by the first mobile network operator to respond to requests to check one or more device identifiers corresponding to respective one or more devices connecting to a first network of the first mobile network operator.

* * * * *